(12) United States Patent
Gupta et al.

(10) Patent No.: US 12,199,813 B2
(45) Date of Patent: Jan. 14, 2025

(54) FRAMEWORK FOR AUTOMATED APPLICATION-TO-NETWORK ROOT CAUSE ANALYSIS

(71) Applicant: Juniper Networks, Inc., Sunnyvale, CA (US)

(72) Inventors: Rahul Gupta, Kanpur (IN); Tarun Banka, Milpitas, CA (US); Mithun Chakaravarrti Dharmaraj, Mountain View, CA (US); Thayumanavan Sridhar, Sunnyvale, CA (US); Raj Yavatkar, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/345,422

(22) Filed: Jun. 30, 2023

(65) Prior Publication Data

US 2024/0007342 A1    Jan. 4, 2024

Related U.S. Application Data

(60) Provisional application No. 63/367,456, filed on Jun. 30, 2022, provisional application No. 63/367,452, (Continued)

(51) Int. Cl.
*G06F 15/173* (2006.01)
*H04L 41/0631* (2022.01)
*H04L 41/16* (2022.01)

(52) U.S. Cl.
CPC .......... *H04L 41/0631* (2013.01); *H04L 41/16* (2013.01)

(58) Field of Classification Search
CPC ............................ H04L 41/0631; H04L 41/16
(Continued)

(56) References Cited

U.S. PATENT DOCUMENTS 7,363,203 B2    4/2008   Hines
9,424,121 B2 *  8/2016   Kushnir .............. G06F 11/0796
(Continued)

FOREIGN PATENT DOCUMENTS

CN    113206761 B    8/2021
EP    3889777 A1     10/2021
(Continued)

OTHER PUBLICATIONS

"Granger Causality," Wikipedia, Last Updated Sep. 28, 2023, 14 pp.
(Continued)

*Primary Examiner* — Alicia Baturay
(74) *Attorney, Agent, or Firm* — Shumaker & Sieffert, P.A.

(57) ABSTRACT

A computing system comprising a memory and processing circuitry may perform the techniques. The memory may store time series data comprising measurements of one or more performance indicators. The processing circuitry may determine, based on the time series data, an anomaly in the performance of the network system, and create, based on the time series data, a knowledge graph. The processing circuitry may determine, in response to detecting the anomaly, and based on the knowledge graph and a machine learning (ML) model trained with previous time series data, a causality graph. The processing circuitry may determine a weighting for each edge in the causality graph, determine, based on the edges in the causality graph, a candidate root cause associated with the anomalies, and determine a ranking of the candidate root cause based on the weighting. The analysis framework system may output at least a portion of the ranking.

20 Claims, 32 Drawing Sheets

Related U.S. Application Data filed on Jun. 30, 2022, provisional application No. 63/367,457, filed on Jun. 30, 2022.

(58) Field of Classification Search
USPC .................................................... 709/224
See application file for complete search history.

(56) References Cited

U.S. PATENT DOCUMENTS

| | | | |
|---|---|---|---|
| 9,571,394 | B1 | 2/2017 | Sivaramakrishnan et al. |
| 9,961,571 | B2* | 5/2018 | Yang ................. H04L 41/16 |
| 10,171,335 | B2* | 1/2019 | Maheshwari ......... H04L 43/067 |
| 10,235,231 | B2* | 3/2019 | Zhang .................. G06N 5/04 |
| 10,257,055 | B2 | 4/2019 | Li et al. |
| 10,263,833 | B2* | 4/2019 | Maheshwari ......... H04L 41/064 |
| 10,289,473 | B2* | 5/2019 | Mendes ............. G06F 11/0709 |
| 10,373,094 | B2* | 8/2019 | Naous ................. G06Q 10/067 |
| 10,574,512 | B1* | 2/2020 | Mermoud ........... H04L 41/5009 |
| 10,616,043 | B2* | 4/2020 | Wang ................. H04L 41/0631 |
| 10,855,548 | B2* | 12/2020 | Garvey ................ H04L 41/142 |
| 10,897,389 | B2* | 1/2021 | Thampy ............... H04L 41/064 |
| 11,061,393 | B2* | 7/2021 | Abe .................... H04L 41/0631 |
| 11,082,439 | B2* | 8/2021 | Salunke ............. G06F 11/3423 |
| 11,138,163 | B2* | 10/2021 | Mdini ................. G06F 16/212 |
| 11,165,631 | B1* | 11/2021 | Chitalia ............. G06F 11/0712 |
| 11,238,129 | B2* | 2/2022 | Jalal ..................... H04L 41/065 |
| 11,265,336 | B2* | 3/2022 | Hild ..................... G06N 20/00 |
| 11,323,312 | B1* | 5/2022 | Banka ................... H04L 43/10 |
| 11,323,327 | B1* | 5/2022 | Chitalia ............... H04L 63/102 |
| 11,422,882 | B1 | 8/2022 | Chhabra |
| 11,500,757 | B2 | 11/2022 | Ambichl et al. |
| 11,616,682 | B2* | 3/2023 | Thampy ............. H04L 43/0823 709/224 |
| 11,636,090 | B2* | 4/2023 | Li ......................... G06F 16/168 707/690 |
| 11,645,293 | B2* | 5/2023 | Pelloin ................ G06F 18/2433 706/11 |
| 11,658,874 | B2* | 5/2023 | Banka .................... H04L 43/14 709/224 |
| 11,675,799 | B2* | 6/2023 | Pierri ................. G06F 16/2474 714/37 |
| 11,765,014 | B2* | 9/2023 | Banka ................. H04L 41/0604 709/223 |
| 11,809,267 | B2* | 11/2023 | Gusat .................. G06F 11/0709 |
| 11,816,178 | B2* | 11/2023 | Jalal ..................... G07C 5/0808 |
| 11,887,015 | B2* | 1/2024 | Fahmy ................... G06F 16/24 |
| 2004/0088730 | A1* | 5/2004 | Gopalan ............ H04N 21/8549 348/E7.054 |
| 2004/0268149 | A1 | 12/2004 | Aaron |
| 2005/0276228 | A1 | 12/2005 | Yavatkar et al. |
| 2008/0262990 | A1 | 10/2008 | Kapoor et al. |
| 2009/0055684 | A1 | 2/2009 | Jamjoom et al. |
| 2011/0214157 | A1 | 9/2011 | Korsunsky et al. |
| 2013/0298184 | A1 | 11/2013 | Ermagan et al. |
| 2014/0157405 | A1 | 6/2014 | Joll et al. |
| 2016/0112443 | A1 | 4/2016 | Grossman et al. |
| 2016/0182373 | A1 | 6/2016 | Wang et al. |
| 2016/0308734 | A1 | 10/2016 | Feller et al. |
| 2017/0075749 | A1 | 3/2017 | Ambichl et al. |
| 2017/0288991 | A1 | 10/2017 | Ganesh |
| 2017/0330096 | A1* | 11/2017 | Das Gupta .......... G06F 11/3409 |
| 2018/0103052 | A1 | 4/2018 | Choudhury et al. |
| 2018/0115470 | A1 | 4/2018 | Huang et al. |
| 2018/0131675 | A1 | 5/2018 | Sengupta et al. |
| 2019/0068693 | A1 | 2/2019 | Bernat |
| 2019/0141015 | A1 | 5/2019 | Nellen |
| 2019/0196894 | A1* | 6/2019 | Cherbakov ......... G06F 11/0709 |
| 2020/0028771 | A1 | 1/2020 | Wong et al. |
| 2020/0136973 | A1 | 4/2020 | Rahman et al. |
| 2020/0272973 | A1 | 8/2020 | Hongtan et al. |
| 2020/0278892 | A1 | 9/2020 | Nainar et al. |
| 2021/0044623 | A1 | 2/2021 | Bosch et al. |
| 2021/0117242 | A1 | 4/2021 | Van De Groenendaal et al. |
| 2021/0135967 | A1 | 5/2021 | Iorga et al. |
| 2021/0160262 | A1 | 5/2021 | Bynum et al. |
| 2021/0320875 | A1 | 10/2021 | Guim Bernat et al. |
| 2021/0367830 | A1 | 11/2021 | Jain et al. |
| 2021/0390423 | A1* | 12/2021 | Latapie ............... H04L 41/0631 |
| 2021/0406091 | A1 | 12/2021 | Thyagaturu et al. |
| 2022/0006783 | A1 | 1/2022 | Hassanzadeh et al. |
| 2022/0029929 | A1 | 1/2022 | Jain et al. |
| 2022/0038471 | A1 | 2/2022 | Sugarbaker et al. |
| 2022/0058042 | A1* | 2/2022 | Vanjare .................. H04L 41/40 |
| 2022/0103431 | A1* | 3/2022 | Singh .................. H04L 67/5682 |
| 2022/0114032 | A1 | 4/2022 | Bernat et al. |
| 2022/0116478 | A1 | 4/2022 | Biederman et al. |
| 2022/0210028 | A1 | 6/2022 | Chen et al. |
| 2022/0224121 | A1 | 7/2022 | Jha et al. |
| 2022/0337555 | A1 | 10/2022 | Gol et al. |
| 2022/0417117 | A1 | 12/2022 | Tayeb et al. |
| 2022/0417323 | A1 | 12/2022 | Julien et al. |
| 2023/0262093 | A1 | 8/2023 | Gupta et al. |
| 2023/0300059 | A1 | 9/2023 | Rodriguez Natal et al. |
| 2023/0388346 | A1 | 11/2023 | Kulshreshtha et al. |
| 2024/0007342 | A1* | 1/2024 | Gupta .................... H04L 12/12 |

FOREIGN PATENT DOCUMENTS

| | | |
|---|---|---|
| WO | 2013184846 A1 | 12/2013 |
| WO | 2022020336 A1 | 1/2022 |

OTHER PUBLICATIONS

"PageRank," Wikipedia, Last Updated Oct. 19, 2023, 22 pp.
Liu et al., "MicroHECL: High-Efficient Root Cause Localization in Large-Scale Microservice Systems," 2021 IEEE/ACM 43rd International Conference on Software Engineering: Software Engineering in Practice (ICSE-SEIP), May 2021, 10 pp.
Meng et al., "Localizing Failure Root Causes in a Microservice through Causality Inference," 2020 IEEE/ACM 28th International Symposium on Quality of Service (IWQoS), Jun. 2020, 10 pp.
U.S. Appl. No. 18/472,042, filed Sep. 21, 2023, by Kommula et al.
U.S. Appl. No. 18/472,050, filed Sep. 21, 2023, by Kommula et al.
U.S. Appl. No. 18/472,059, filed Sep. 21, 2023, by Kommula et al.
U.S. Appl. No. 18/472,092, filed Sep. 21, 2023, by Kommula et al.
U.S. Appl. No. 18/472,111, filed Sep. 21, 2023, by Kommula et al.
U.S. Appl. No. 18/472,123, filed Sep. 21, 2023, by Kommula et al.
Wu et al., "MicroRCA: Root Cause Localization of Performance Issues in Microservices," IEEE/IFIP Network Operations and Management Symposium (NOMS), Apr. 2020, 10 pp.
PCT Application No. PCT/US2023/069485, filed Jun. 30, 2023, naming inventors Gupta et al.
International Search Report and Written Opinion of International Application No. PCT/US2023/069485 dated Oct. 30, 2023, 12 pp.
"Amazon SageMaker—Developer Guide," retrieved from https://docs.aws.amazon.com/sagemaker/latest/dg/randomcutforest.html on Feb. 15, 2024, 6167 pp.
"cSRX Container Firewall," retrieved from https://www.juniper.net/us/en/products/security/srx-series/csrx-containerized-firewall.html, on Feb. 15, 2024, 2 pp.
"Emerging Technologies: Adoption Growth Insights—Function Accelerator Cards Cards(Next-Gen SmartNICs, DPUs, IPUs)," Gartner Research, Sep. 14, 2021, 6 pp.
"NVIDIA BlueField Networking Platform," retrieved from https://www.nvidia.com/en-us/networking/products/data-processing-unit/, on Feb. 15, 2024, 7 pp.
"The Istio Service Mesh," retrieved from https://istio.io/latest/about/service-mesh/, on Feb. 15, 2024, 5 pp.
Kim et al., "A Case for SmartNIC-accelerated Private Communication," APNet '20: Proceedings of the 4th Asia-Pacific Workshop on Networking, Aug. 2020, 8 pp.
Liu et al., "Offloading Distributed Applications onto SmartNICs using iPipe," In Proceedings of the ACM Special Interest Group on Data Communication (SIGCOMM '19), Aug. 19-23, 2019, 16 pp.
Liu et al., "Performance Characteristics of the BlueField-2 SmartNIC," arXiv:2105.06619, May 14, 2021, 13 pp.
Moro et al., "FOP4: Function Offloading Prototyping in Heterogeneous and Programmable Network Scenarios," 2019 IEEE Conference on Network Function Virtualization and Software Defined Network, Nov. 2019, 6 pp.

(56) References Cited

OTHER PUBLICATIONS

Soldani et al., "Anomaly Detection and Failure Root Cause Analysis in (Micro) Service-Based Cloud Applications: A Survey," arXiv:2105.12378, May 26, 2021, 36 pp.

Tanenbaum et al., "Distributed Systems: Principles and Paradigms," Second Edition, Prentice-Hall, (Applicant points out, in accordance with MPEP 609.04(a), that the year of publication, 2007, is sufficiently earlier than the effective U.S. filing date, so that the particular month of publication is not in issue.) pp. 125-140.

* cited by examiner

|  | Endpoint | Input | Output | Description |
|---|---|---|---|---|
| POST | /graph | {"DataSource": <> "TimeInterval: <>} | {uuid: <graph uuid>} | This creates knowledge graph |
| GET | /graph | {uuid: <graph uuid> Name: <graph name> | Graph Json | This return graph nodes in a |
| DELETE | /graph | {uuid: <graph id>} | Success/Fail | Deletes existing knowledge graph from the database |
| GET | /graph/metadata | {uuid: <graph id> | Metadata json | Returns meta data about the knowledge graph |
| POST | /graph/prune | {uuid: <graph id>, prune_algo: <options for graph pruning>} | Uuid of the subgraph. | Returns subgraph of original knowledge graph based on the criteria. |
| POST | /graph/rcajob | {"DataSource": "TimeInterval": "EndTime": } | Jobid of the RCA job | This periodically creates knowledge graph for temporal analysis |

FIG. 11

| | ENDPOINT | INPUT | OUTPUT | DESCRIPTION |
|---|---|---|---|---|
| POST | /topology/rca | {uuid: {id of knowledge graph}} | rca_id | |
| GET | /topology/rca_rank | {rca_id: <id of the RCA job>} | [List of metrics with rank] | Initiate RCA analysis for a given graph |
| GET | /topology/causality_graph | <uuid: uuid of causality graph> | List of directed edges with weights [(n1, n2, w1), n ] | |
| DELETE | /topology/causality_graph | <uuid: uuid of causality graph> | | |
| POST | /topology/causality_graph/node | <uuid: causaility_graph id, Node: [n1, n2...] <list of node to be added> | Success Failure | Add one or more KPI node to the causality graph |

FIG. 12

| Root Cause Node | Rank | Score |
|---|---|---|
| ratings-v1-7cd65f58d7-pmlfq_podCPUUsagePercentage | 1 | 0.088 |
| ratings-v1-7cd65f58d7-pmlfq_podMemoryUsagePercentage | 2 | 0.076 |
| ratings-v1_requestCountTotal | 3 | 0.067 |
| ratings-v1_requestLatencyMinutelyAvgMilliSec | 4 | 0.0668 |
| details-v1-7f7f696b95-qpgjl_podCPUUsagePercentage | 5 | 0.660 |

FIG. 13

APIs:

| | | INPUT | OUTPUT | |
|---|---|---|---|---|
| POST | /graph_analytics/alarm_propagation | {graph_id: <uuid><br>Mode:<br><top_down,<br>bottom-up><br>anomolous_node:<br><node_id> | <task_id> | API to initiate Alarm propagation analysis |
| GET | /graph_analytics/alarm_propagation/paths | <task_id> | <Set of paths of possible alarm propagation> | It returns set of paths nodes through which observed anomaly can propagate to application layer. |

FIG. 19A

| Operation | Endpoint | Input | Output | |
|---|---|---|---|---|
| POST | /graph_analytics/change_analysis | {<br>First_graph: <<uuid><br>Second_graph: <<uuid>><br>} | <task_id> | Creates a task for performing change analysis |
| GET | /graph_analytics/change_analysis | {<br>Task_id: <id><br>LayerType: optional <e.g. All_layers, App_layer, pod_layer, Compute_layer, Network_layer><br>} | Layer: {<br>Added_Nodes: [List of uuid]<br>Deleted_Nodes: [List of uuid]<br>Added_Edges: [list of edges]<br>Deleted_Edges: [list of edges]<br>Added_Alarms: [list of alarms]<br>Resolved_Alarms: [list of alarms]<br>} | Return the result of change analysis of two graphs.<br><br>It takes LayerType as optional input argument, by default change analysis is performed for all layers of the graph, unless specific layer is specified. |

FIG. 19B

| Operation | Endpoint | Input | Output | |
|---|---|---|---|---|
| GET | /graph_analytics/app_to_network | {graph_id: <<uuid>>,<br>App_Edge_id: <application edge id> } | Set of Network Probe Nodes for monitoring input edge communication | Thi |

FIG. 19C

Figure 2: Different Application Mapping to Network Regions in a Knowledge Graph

| | Endpoint | Input | Output | Description |
|---|---|---|---|---|
| POST | /topology | {<br>TopologyType: <underlay, overlay, kubernetes ><br>Topology_Source: <datacenter, sdwan><br>TopologyMap: <><br>} | <uuid> | Register topology for which probe needs to be created. |
| GET | /topology | {uuid: <uuid of the topology} | Topology Json | Return registered topology |
| POST | /probe_generator | {<br>topology_uuid: <><br><br>application_to_network_map: {app1, app2, ...} <optional><br>} | | Initiate Probe generation while considering topology and application |
| GET | /probe/server | {server_uuid: <>} | Probe_list={ } | List of probes configured on a server |
| GET | /probe/tor | {tor_switch_uuid: <>} | Probe_list ={} | List of probes configured across all servers under ToR switch |
| GET | /probe/topology | {topology_uuid: <>} | Probe_list = {} | List of all probes. Configured for a given topology |
| GET | /probe/application | {application_uuid: <>} | Probe_list={ } | List of all probes configured to monitor performance a given application |

FIG. 25

FRAMEWORK FOR AUTOMATED APPLICATION-TO-NETWORK ROOT CAUSE ANALYSIS

This application claims the benefit of the following provisional applications: U.S. Provisional Application No. 63/367,457, entitled "FRAMEWORK FOR AUTOMATED APPLICATION-TO-NETWORK ROOT CAUSE ANALYSIS," filed Jun. 30, 2022; U.S. Provisional Application No. 63/367,456, entitled "GRAPH ANALYTICS ENGINE FOR APPLICATION-TO-NETWORK TROUBLESHOOTING," filed Jun. 30, 2022; and U.S. Provisional Application No. 63/367,452, entitled "APPLICATION-AWARE ACTIVE MEASUREMENT FOR MONITORING NETWORK HEALTH," filed Jun. 30, 2022, each of which is incorporated by reference in its entirety herein.

TECHNICAL FIELD

The disclosure relates to computer networks, and more particularly, to root cause analysis of anomalies in computer networks.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

SUMMARY

In general, this disclosure describes techniques, systems and a framework for performing root cause analysis of network issues. The root cause analysis can include analysis of data collected at several different layers of a network system, including application layers to network layers. Application performance can be based on many factors, including dynamics of application behavior, compute/memory/storage infrastructure, and network performance behavior. Any performance bottleneck in the underlying physical layer has the potential to degrade the performance of the application perceived by the end users. Emergence of microservices based cloud native application architecture and their highly distributed nature has the potential to make troubleshooting any performance bottleneck a highly challenging task. Network performance can be even more critical to the performance of microservice based applications, which may operate in reduced timeframes (e.g., on the order of milliseconds, seconds, and/or minutes), being initialized and de-initialized based on demand or other factors. Given the reduced timeframes, quickly determining the root cause of application performance degradation to reduce MTTR (Mean time to Resolution) and MTTI (Mean Time to Identify) issues in a network may allow more efficient operation of microservice based applications. Disclosed herein is a framework and system configured to localize the root cause of the performance degradation of a microservices-based application by correlating application performance with the performance of the underlying components such as compute resources and network devices used by the application.

In this respect various aspects of the techniques may improve operation of microservice based applications themselves along with computing systems executing such microservice based applications. That is, troubleshooting microservice based application that are quickly initiated in response to demand and therefore may be short lived (e.g., on the order of milliseconds, seconds, and/or minutes) and automating identification of root causes that degrade the performance of microservice based application may allow for more efficient (e.g., in terms of computing resources, such as processing cycles, memory storage consumption, memory bus bandwidth utilization, associated power consumption, etc.) operation of underlying computing devices that execute the microservice based applications. In other words, by automatically performing a root cause analysis, various issues that impact execution of the microservice based applications may more quickly identify causes of degraded operation of microservice based applications, thereby resulting in more efficient operation of the microservice based applications but also the underlying computing devices executing the microservice based applications.

In one example, various aspects of the techniques are directed to a method comprising: receiving, by an analysis framework system from devices of a network system, a time series data comprising measurements of one or more performance indicators; determining, by the analysis framework system and based on the time series data, one or more anomalies in the performance of the network system; creating, based on the time series data, a knowledge graph comprising first nodes in the network system referenced in the time series, the first nodes representing elements residing at one or more of a plurality of network service layers associated with the network system; determining, by the analysis framework system in response to detecting the one or more anomalies, and based on the knowledge graph and a machine learning (ML) model trained with previous time series data, a causality graph, wherein the causality graph includes second nodes associated with the performance indicators, wherein edges between the first nodes and the second nodes indicate relationships between the first nodes and the second nodes, and wherein the knowledge graph and the causality graph each includes edges between one or more of the first nodes and one or more of the second nodes that are associated with elements residing at different network service layers of the plurality of network service layers; determining a weighting for each of the edges in the causality graph; determining, based on the edges in the causality graph, one or more candidate root causes associated with the one or more anomalies; determining a ranking of the one or more candidate root causes based on the weighting of the edges in the causality graph; and outputting at least a portion of the ranking.

In another example, various aspects of the techniques are directed to a computing system comprising: a memory configured to store a time series data comprising measurements of one or more performance indicators; and processing circuitry configured to execute an analysis framework system, the analysis framework system configured to: determine, based on the time series data, one or more anomalies in the performance of the network system; create, based on the time series data, a knowledge graph comprising first nodes in the network system referenced in the time series, the first nodes representing elements residing at one or more of a plurality of network service layers associated with the network system; determine, in response to detecting the one or more anomalies, and based on the knowledge graph and a machine learning (ML) model trained with previous time series data, a causality graph, wherein the causality graph includes second nodes associated with the performance indicators, wherein edges between the first nodes and the second nodes indicate relationships between the first nodes and the second nodes, and wherein the knowledge graph and the causality graph each includes edges between one or more of the first nodes and one or more of the second nodes that are associated with elements residing at different network service layers of the plurality of network service layers; determine a weighting for each of the edges in the causality graph; determine, based on the edges in the causality graph, one or more candidate root causes associated with the one or more anomalies; determine a ranking of the one or more candidate root causes based on the weighting of the edges in the causality graph; and output at least a portion of the ranking.

In another example, various aspects of the techniques are directed to a non-transitory computer-readable storage medium having instructions stored thereon that, when executed, cause one or more processors to execute a framework analysis system, wherein the framework analysis system is configured to: receive a time series data comprising measurements of one or more performance indicators; determine, based on the time series data, one or more anomalies in the performance of the network system; create, based on the time series data, a knowledge graph comprising first nodes in the network system referenced in the time series, the first nodes representing elements residing at one or more of a plurality of network service layers associated with the network system; determine, in response to detecting the one or more anomalies, and based on the knowledge graph and a machine learning (ML) model trained with previous time series data, a causality graph, wherein the causality graph includes second nodes associated with the performance indicators, wherein edges between the first nodes and the second nodes indicate relationships between the first nodes and the second nodes, and wherein the knowledge graph and the causality graph each includes edges between one or more of the first nodes and one or more of the second nodes that are associated with elements residing at different network service layers of the plurality of network service layers; determine a weighting for each of the edges in the causality graph; determine, based on the edges in the causality graph, one or more candidate root causes associated with the one or more anomalies; determine a ranking of the one or more candidate root causes based on the weighting of the edges in the causality graph; and output at least a portion of the ranking.

In another example, various aspects of the techniques are directed to a method comprising: receiving, by an analysis framework system from devices of a network system, time series data comprising measurements of one or more performance indicators; creating, by the analysis framework system based on the time series data, a knowledge graph comprising a plurality of first nodes in the network system referenced in the time series, the first nodes representing elements residing at one or more of a plurality of layers associated with the network system, wherein edges between two nodes of the plurality of nodes indicate a communication or computing dependency between the two nodes; receiving, by a graph analytics service of the analysis framework system, a graph analysis request, the graph analysis request comprising a request to determine a fault propagation path, a request to determine changes in the graph, a request to determine an impact of an emulated fault, or a request to determine an application-to-network path; determining, by the graph analytics service, a response to the graph analysis request; and outputting, by the analysis framework system, the response to the graph analysis request.

In another example, various aspects of the techniques are directed to a computing device comprising: processing circuitry configured to execute an analysis framework system; and a memory configured to store time series data comprising measurements of one or more performance indicators, wherein the analysis framework system is configured to: create, based on the time series data, a knowledge graph comprising a plurality of first nodes in the network system referenced in the time series, the first nodes representing elements residing at one or more of a plurality of layers associated with the network system, wherein edges between two nodes of the plurality of nodes indicate a communication or computing dependency between the two nodes; cause a graph analytics service of the analysis framework system to receive a graph analysis request, the graph analysis request comprising a request to determine a fault propagation path, a request to determine changes in the graph, a request to determine an impact of an emulated fault, or a request to determine an application-to-network path; cause the graph analytics service to determine a response to the graph analysis request; and output the response to the graph analysis request.

In another example, various aspects of the techniques are directed to a non-transitory computer-readable storage medium having instructions stored thereon that, when executed, cause one or more processors to execute an analysis framework system configured to: receive time series data comprising measurements of one or more performance indicators; create, based on the time series data, a knowledge graph comprising a plurality of first nodes in the network system referenced in the time series, the first nodes representing elements residing at one or more of a plurality of layers associated with the network system, wherein edges between two nodes of the plurality of nodes indicate a communication or computing dependency between the two nodes; cause a graph analytics service of the analysis framework system to receive a graph analysis request, the graph analysis request comprising a request to determine a fault propagation path, a request to determine changes in the graph, a request to determine an impact of an emulated fault, or a request to determine an application-to-network path; cause the graph analytics service to determine a response to the graph analysis request; and output the response to the graph analysis request.

In another example, various aspects of the techniques are directed to a comprising: determining, by a network system, a topology graph for a network, the topology graph representing a plurality of logical layers of the network; receiving, by the network system, an identifier associated with an application utilizing the network for communications; determining, by the network system and based on the topology graph, a subgraph of the topology graph based on a location, in the topology graph, of a node representing a compute node that is a host of the application; determining, by the network system and based on the subgraph, a set of one or more probe modules to measure performance metrics associated with network communication associated with the application; for each of the one or more probe modules, generating, by the network system, configuration data corresponding to a type of the probe module; and outputting, by the network system and to the probe module, the configuration data corresponding to the probe module.

In another example, various aspects of the techniques are directed to a network system comprising: processing circuitry configured to determine a topology graph for a network, the topology graph representing a plurality of logical layers of the network; and a memory configured to store the topology graph, wherein the processing circuitry is further configured to: receive an identifier associated with an application utilizing the network for communications; determine, based on the topology graph, a subgraph of the topology graph based on a location, in the topology graph, of a node representing a compute node that is a host of the application; determine, based on the subgraph, a set of one or more probe modules to measure performance metrics associated with network communication associated with the application; for each of the one or more probe modules, generate configuration data corresponding to a type of the probe module; and output, to the probe module, the configuration data corresponding to the probe module.

In another example, various aspects of the techniques are directed to a non-transitory computer-readable storage medium having instructions stored thereon that, when executed, cause one or more processors to: determine a topology graph for a network, the topology graph representing a plurality of logical layers of the network; receive an identifier associated with an application utilizing the network for communications; determine, based on the topology graph, a subgraph of the topology graph based on a location, in the topology graph, of a node representing a compute node that is a host of the application; determine, based on the subgraph, a set of one or more probe modules to measure performance metrics associated with network communication associated with the application; for each of the one or more probe modules, generate configuration data corresponding to a type of the probe module; and output, to the probe module, the configuration data corresponding to the probe module.

The details of one or more examples are set forth in the accompanying drawings and the description below. Other features, objects, and advantages will be apparent from the description and drawings, and from the claims.

BRIEF DESCRIPTION OF DRAWINGS

FIG. 11 is a conceptual diagram illustrating an example set of APIs for accessing and updating a knowledge graph.

FIG. 12 is a conceptual diagram illustrating an example set of APIs for accessing and updating a causality graph.

FIG. 13 is a conceptual diagram illustrating an example PageRank output from the root cause analysis pipeline described in FIGS. 2 and 3.

FIG. 19A is a conceptual diagram that illustrates an API exposed by a graph analytics service.

FIG. 19B is a conceptual diagram that illustrates a set of APIs exposed by graph analytics service that can be used to initiate graph change analysis and query the results of the graph change analysis.

FIG. 19C is a conceptual diagram illustrating an API for performing an application-to-network map analysis.

FIG. 25 is a conceptual diagram illustrating example endpoints of a probe generator service, in accordance with techniques of the disclosure.

DETAILED DESCRIPTION

Figure 1:
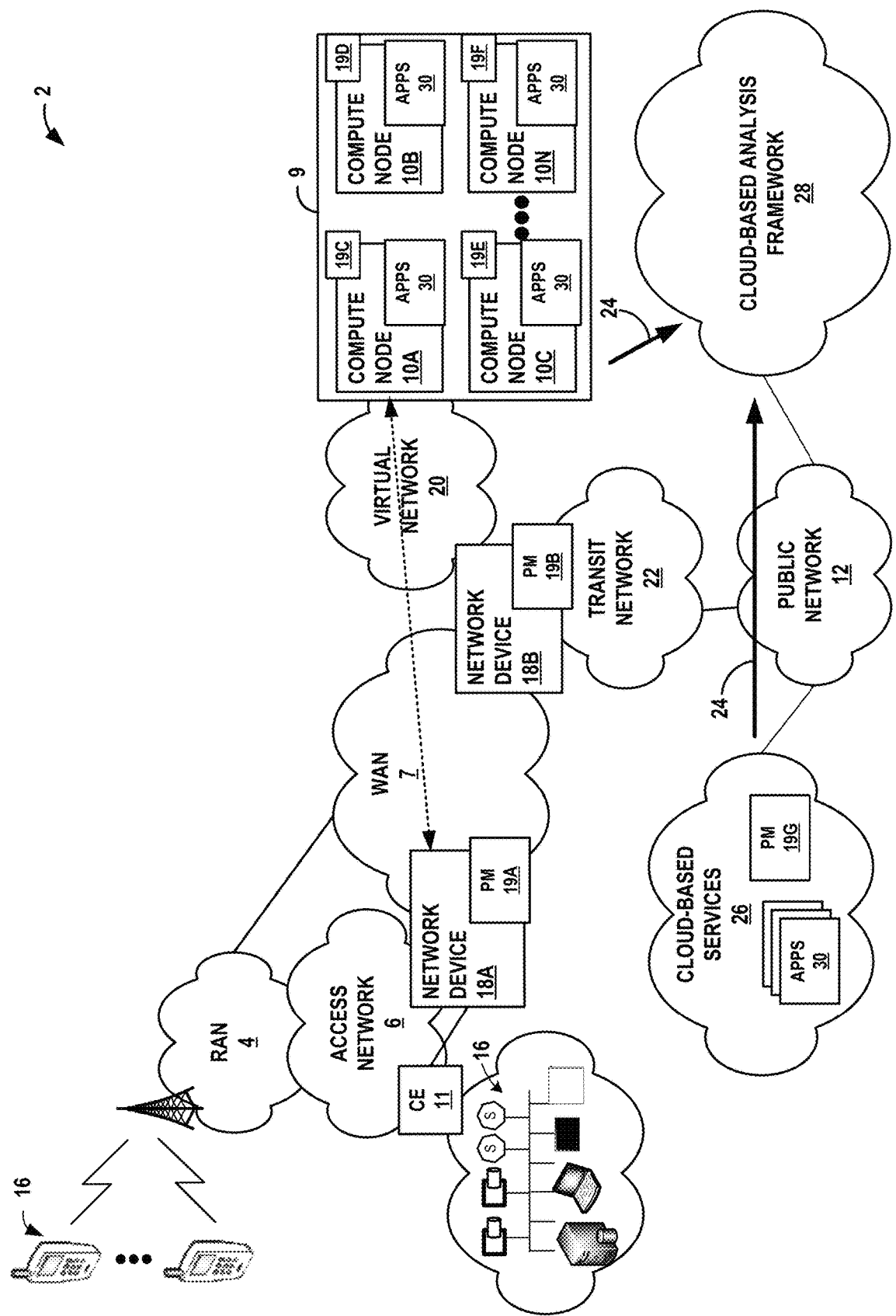
FIG. 1 is a block diagram illustrating an example network system including a framework system for application-to-network root cause analysis, in accordance with one or more aspects of the techniques described in this disclosure.

FIG. 1 is a block diagram illustrating an example network system 2, including a framework system for application-to-network root cause analysis, in accordance with one or more aspects of the techniques described in this disclosure. Network system 2 may provide packet-based network services to subscriber devices 16. That is, network system 2 may provide authentication and establishment of network access for subscriber devices 16 such that a subscriber device may begin exchanging data packets with public network 12, which may be an internal or external packet-based network such as the Internet.

In the example of FIG. 1, network system 2 comprises access network 6 that provides connectivity to public network 12 via wide area network 7 (hereinafter, "WAN 7"). WAN 7 and public network 12 may provide packet-based services that are available for request and use by subscriber devices 16. As examples, WAN 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, subscriber devices 16 connect to network devices 18A-18B (collectively, "network devices 18") via access network 6 to receive connectivity to subscriber services for applications hosted by public network 12. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (S), televisions, appliances, etc. In addition, subscriber devices 16 may comprise mobile devices that access the data services of network system 2 via a radio access network (RAN) 4. Example mobile subscriber devices include mobile telephones, laptop or desktop computers having, e.g., a wireless card, wireless-capable netbooks, tablets, video game devices, pagers, smart phones, personal data assistants (PDAs) or the like.

A network service provider operates, or in some cases leases, elements (e.g., network devices—not shown in the example of FIG. 1) of access network 6 to provide packet transport between subscriber devices 16 and network device 18A. Access network 6 represents a network that aggregates data traffic from one or more of subscriber devices 16 for transport to/from WAN 7 of the service provider. Access network 6 includes network nodes that execute communication protocols to transport control and user data to facilitate communication between subscriber devices 16 and network device 18A. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN), e.g., RAN 4. Examples of the RAN include networks conforming to a $5^{th}$ Generation (5G) mobile network, $4^{th}$ Generation (4G) mobile network Universal Mobile Telecommunications System (UMTS) architecture, an evolution of UMTS referred to as Long Term Evolution (LTE), 5G including enhanced mobile broadband, mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

Network device 18 may each be a customer edge (CE) router, a provider edge (PE) router, SD-WAN edge device, service device, network appliance, a server executing virtualized network functions, or other computing device that provides connectivity between networks, e.g., access network 6 and public network 12, or network services. WAN 7 offers packet-based connectivity to subscriber devices 16 attached to access network 6 for accessing public network 12 (e.g., the Internet). WAN 7 may represent a public network that is owned and operated by a service provider to interconnect a plurality of networks, which may include access network 6. In some examples, WAN 7 may implement Multi-Protocol Label Switching (MPLS) forwarding and in such instances may be referred to as an MPLS network or MPLS backbone. In some instances, WAN 7 represents a plurality of interconnected autonomous systems, such as the Internet, that offers services from one or more service providers. Public network 12 may represent the Internet. Public network 12 may represent an edge network coupled to WAN 7 via a transit network 22 and one or more network devices, e.g., a customer edge device such as customer edge switch or router. Public network 12 may include a data center. In the example of FIG. 1, network device 18B may exchange packets with compute nodes 10A-10D ("compute nodes 10") via virtual network 20, and network device 18B may forward packets to public network 12 via transit network 22.

In examples of network system 2 that include a wireline/broadband access network, network devices 18A or 18B may represent a Broadband Network Gateway (BNG), Broadband Remote Access Server (BRAS), MPLS PE router, core router or gateway, or Cable Modem Termination System (CMTS). In examples of network system 2 that include a cellular access network as access network 6, network devices 18A or 18B may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to network device 18B may be implemented in a switch, service card or another network element or component. In some examples, network device 18B may itself be a service node.

A network service provider that administers at least parts of network system 2 typically offers services to subscribers associated with devices, e.g., subscriber devices 16, that access network system 2. Services offered may include, for example, traditional Internet access, VoIP, video and multimedia services, and security services. As described above with respect to WAN 7, WAN 7 may support multiple types of access network infrastructures that connect to service provider network access gateways to provide access to the offered services, e.g., service provided by service node 10. In some instances, the network system may include subscriber devices 16 that attach to multiple different access networks 6 having varying architectures.

In general, any one or more of subscriber devices 16 may request authorization and data services by sending a session request to a gateway device such as network devices 18A or 18B. In turn, the network device may access a central server (not shown) such as an Authentication, Authorization and Accounting (AAA) server to authenticate the one of subscriber devices 16 requesting network access. Once authenticated, any of subscriber devices 16 may send subscriber data traffic toward WAN 7 to access and receive services provided by public network 12, and such packets may traverse network devices 18A or 18B as part of at least one packet flow. In some examples, network device 18A may forward all authenticated subscriber traffic to public network 12, and network device 18B may apply services and/or steer particular subscriber traffic to data center 9 if the subscriber traffic requires services on compute nodes 10. Service applications to be applied to the subscriber traffic may be hosted on compute nodes 10.

For example, network system 2 includes a data center 9 having a cluster of compute nodes 10 that provide an execution environment for the virtualized network services. In some examples, each of compute nodes 10 represents a service instance. Each of compute nodes 10 may apply one or more services to traffic flows. As such, network device 18B may steer subscriber packet flows through defined sets of services provided by compute nodes 10. That is, in some examples, each subscriber packet flow may be forwarded through a particular ordered combination of services provided by compute nodes 10, each ordered set being referred to herein as a "service chain." As examples, compute nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

In some examples, network system 2 comprises a software defined network (SDN) and network functions virtualization (NFV) architecture. In these examples, an SDN controller (not shown) may provide a controller for configuring and managing the routing and switching infrastructure of network system 2.

Although illustrated as part of data center 9, compute nodes 10 may be network devices coupled by one or more switches or virtual switches of WAN 7. In one example, each of compute nodes 10 may run as virtual machines (VMs) in a virtual compute environment. Moreover, the compute environment may comprise a scalable cluster of general computing devices, such as x86 processor-based services. As another example, compute nodes 10 may comprise a combination of general-purpose computing devices and special-purpose appliances. As virtualized network services, individual network services provided by compute nodes 10 can scale just as in a modern data center through the allocation of virtualized memory, processor utilization, storage and network policies, as well as horizontally by adding additional load balanced VMs. In other examples, compute nodes 10 may be gateway devices or other routers. In further examples, the functionality described with respect to each of compute nodes 10 may be implemented in a switch, service card, or another network element or component.

Subscriber devices 16 may be configured to utilize the services provided by one or more of applications 30 hosted on servers that are part of cloud-based services 26. In some aspects, cloud-based services 26 may be provided from one or more datacenters, including datacenter 9 by way of compute nodes 10. An application 30 may be configured to provide a single service, or it may be configured as multiple microservices. For purposes of illustration, it is assumed that application 30 is configured as multiple microservices. A subscriber device 16 can utilize the services of an application 30 by communicating requests to the application 30 and receiving responses from the application 30 via public network 12. In some aspects, applications 30 may be containerized applications (or microservices). Containerization is a virtualization scheme based on operating system-level virtualization. Containers are light-weight and portable execution elements for applications that are isolated from one another and from the host. Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and instead provide an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

As described herein, computing devices within network system 2 may provide network monitoring services. For example, network devices 18 and/or compute nodes 10 are configured as measurement points (e.g., with probe modules) to provide network monitoring services to determine, for example, network performance and functionality, as well as interconnections of service chains. Probe modules may provide telemetry data (e.g., in the form of timeseries data, which may also be referred to as "time series data") that can be used to determine health of some or all of the network. Probe modules may be implemented as plugin modules provided as part of a cloud as a Software-as-a-Service (SaaS) solution, software deployed on premises in NFV environments, software modules installed to host computing devices, or other implementations. Computing devices configured with probe modules may send and/or receive test packets to compute one or more key performance indicators (KPIs) of the network, such as latency, delay (inter frame gap), jitter, packet loss, throughput, and the like. Probe modules may send test packets in accordance with various protocols, such as Hypertext Transfer Protocol (HTTP), Internet Control Message Protocol (ICMP), Speedtest, User Datagram Protocol (UDP), Transmission Control Protocol (TCP), Operations, Administration and Maintenance (OAM) functions (e.g., Y.1731), Two-Way Active Measurement Protocol (TWAMP), Internet Protocol television (IPTV) and Over the Top (OTT) protocol, VoIP telephony and Session Initiation Protocol (SIP), mobile radio, remote packet inspection, and other protocols to measure network performance. Probe modules on compute nodes may calculate KPIs related to resource utilization, such as CPU utilization, memory utilization, etc.

In the example of FIG. 1, network device 18A is configured with probe module ("PM") 19A ("PM 19A"), network device 18B is configured with probe module 19B ("PM 19B"), compute node 10A is configured with probe module 19C ("19C"), compute node 10B is configured with probe module 19D ("19D"), compute node 10C is configured with probe module 19E ("19E"), compute node 10D is configured with probe module 19F ("19F"), and at least one application 30 of cloud based services 26 is configured with probe module 19G ("PM 19G"). Although each of network devices 18 and compute nodes 10 are described as being configured with a probe module, any number of network devices and/or service nodes may be configured with probe modules to provide monitoring services. Probe modules 19A-19G are referred to collectively as "probe modules 19." Probe modules 19 can produce and/or collect performance statistics (e.g., KPIs) regarding application and network performance.

Probe modules 19 and other devices and services send their KPIs 24 to cloud-based analysis framework system 28 as a time series data. Cloud based analysis framework system 28 can receive KPIs and other data from probe modules 19, and use the received data to detect anomalies in network and/or compute node operation. In some aspects, cloud-based analysis framework system 28 can be implemented, at least in part, as a containerized framework system. Further details on the processing of the time series of data are provided below with respect to FIGS. 2 and 3.

Figure 2:
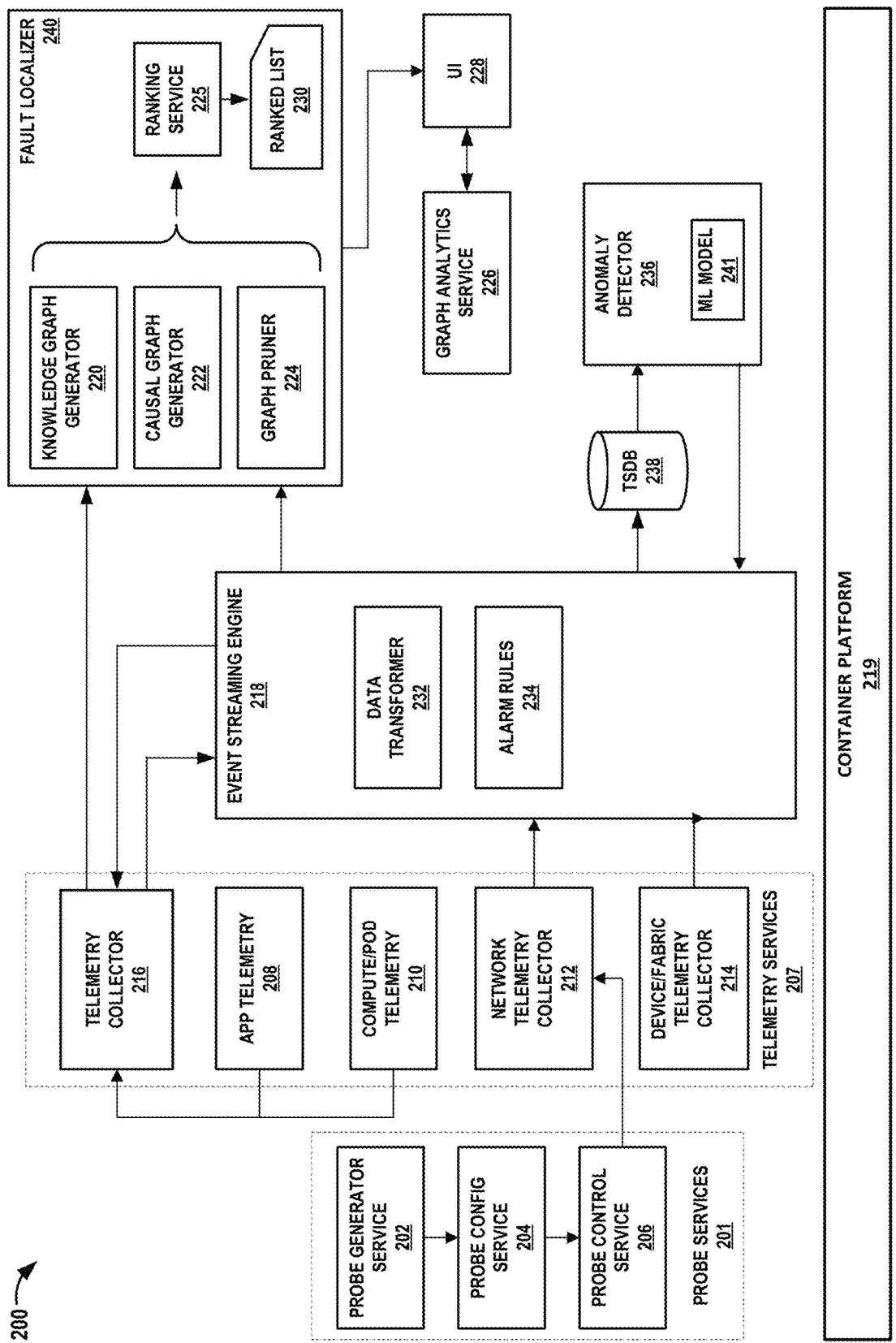
FIG. 2 is a block diagram illustrating a root-cause analysis framework system, in accordance with aspects of the disclosure.

FIG. 2 is a block diagram illustrating a root-cause analysis framework system, in accordance with aspects of the disclosure. Root cause analysis framework system 200 can be implemented as part of cloud-based analysis framework system 28 (FIG. 1). In some aspects, root cause analysis framework system 200 includes probe services 201, telemetry services 207, telemetry collector 216, event streaming engine 218, and fault localizer 240.

Probe services 201 include services that create, configure, and/or control probe modules that collect network telemetry data (e.g., probe modules 19 of FIG. 1). In some aspects, probe services 201 can include probe generator service 202, probe configuration service 204 and probe control service 206. Probe generator service 202 analyzes a network configuration, and can generate probe modules that are adapted for particular network devices or types of network devices (both physical and virtual) that may be present in network system 2.

Probe configuration service 204 can configure probe modules generated by probe generation service 202 for execution on network system 2. Probe control service 206 can deploy probe modules and monitor the execution of probe modules (e.g., probe modules 19). Further details regarding probe generator service 202 and probe configuration service 204 are provided below with respect to FIGS. 21-26.

Figure 21:
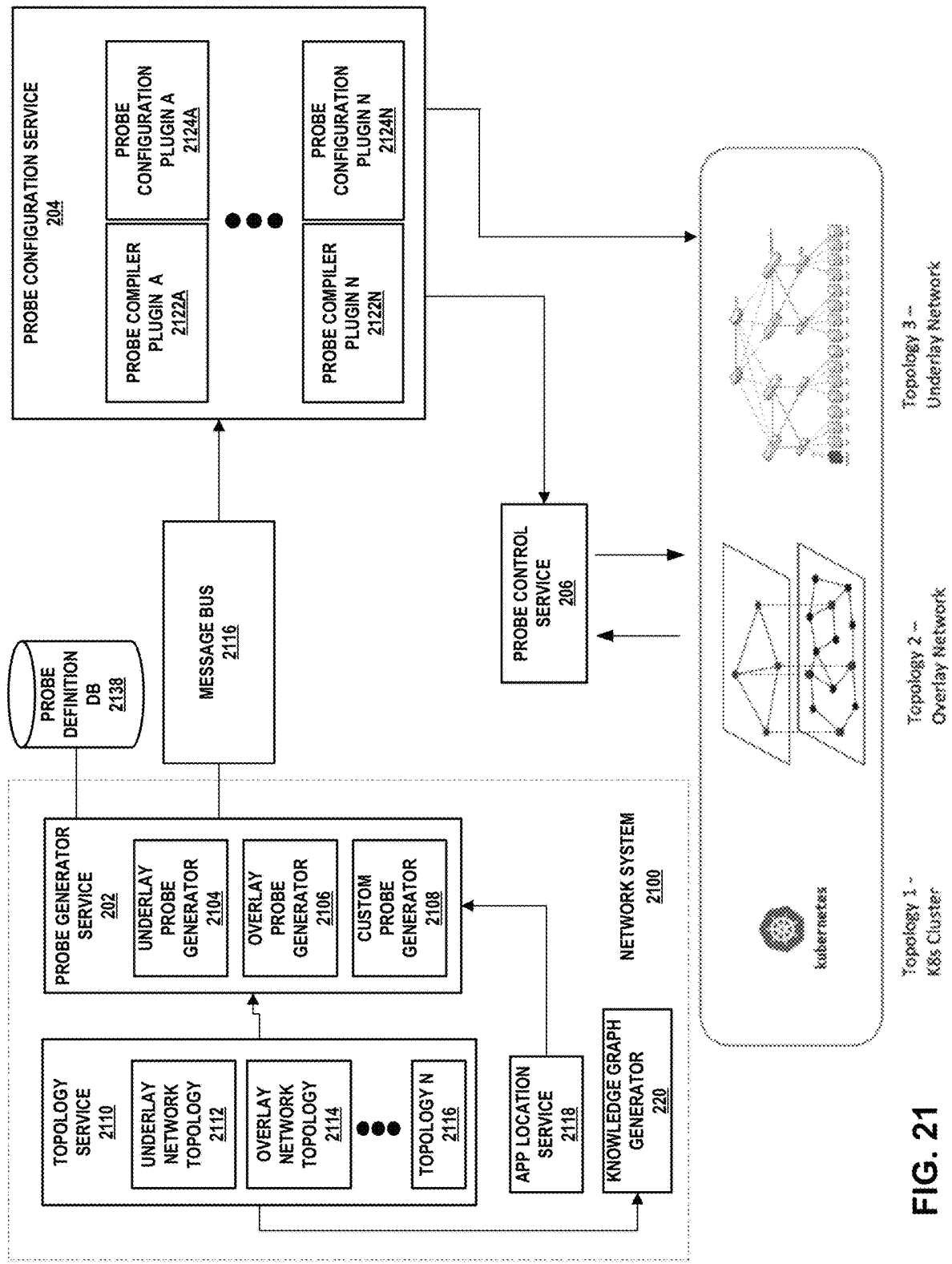
FIG. 21 is a block diagram illustrating additional details of a network system that utilizes a root cause analysis framework system, in accordance with aspects of the disclosure.

FIG. 21 is a block diagram illustrating additional details of a network system 2100 configured to use a root cause analysis framework system, in accordance with aspects of the disclosure. In some aspects, network system 2100 can include topology service 2110 and application location service 2118 in addition to probe generator service 202, probe configuration service 204, probe control service 206, and knowledge graph generator 220. Topology service 2110 can determine a network topology for which network probe modules need to be configured to measure end-to-end network performance. Examples of topologies that may be supported by topology service 2110 include underlay network topology 2112, overlay network topology 2114, and other topologies 2116 such as a Kubernetes cluster topology.

Application location service 2118 can determine a subgraph in the network topology that needs to be monitored from an application perspective. That is, application location service can determine a subset of then network topology used to send and receive network data for the application. This can be determined based on service nodes on which different instances of the applications are hosted and the network that is responsible for communication between the set of endpoint hosts for network traffic associated with the application. Application location service 2118 can use a knowledge graph of the system that represents all the application and corresponding infrastructure components as a graph data structure. In some aspects, knowledge graph generator 220 generates a knowledge graph. Application-to-network queries on this knowledge graph help determine a subset of the network that is responsible for communication of the application.

Probe generator service 202 is responsible for determining a set of network probe modules that need to be configured for a given network which is determined based on the network topology and corresponding application placement in the network. Probe generator service 202 can receive a network topology and an application location as an input, and can determine a set of network probe modules that can obtain performance measurements related to the application. The set of network probe modules generated by probe generator service is localized to the portion of the network topology used to communicate network traffic of the application.

Depending on the environment, network probe modules of different types may need to be generated. For example, if an application has specific QoS requirement, then probe modules to detect specific QoS bits, e.g., DSCP bits in an IP header need to be generated to actively measure performance of the network from the application perspective. Moreover, there are different types of topologies, e.g., underlay network, overlay network, Kubernetes Clusters, etc., for which probe modules need to be generated. Depending on the topology, different probe generator plugins may be supported which are responsible for determining a set of probe modules while considering application needs, coverage, and cost for active probing for a given topology. Example of different plugins include CLOS datacenter network topology plugin, Overlay network plugin, SD-WAN topology plugin, Kubernetes cluster plugin, etc. In the example of FIG. 21, underlay probe generator 2104 determines a set of probe modules to be used to measure performance of network components in a subset of nodes of an underlay network that are used to communicate data for the application. Overlay probe generator 2106 determines a set of probe modules to be used to measure performance of network components of a subset of nodes of an overlay network that are used to communicate data for the application. Custom probe generator 2108 can generate probe modules used to measure performance of components such as Kubernetes components that are utilized by the application. Each of generators 2104, 2106, and 2108 can generate a list of probe modules, where the list indicates the probe to be used, a server to execute the probe, and a set of one or more servers that are to be probed. In some aspects, probe modules are only generated for that portion of the network topology that is used by the application.

Independent of the input topology or application mapping to network regions, different probe generation service 202 adapters can have a consistent format to represent probe modules that need to be configured. It is a represented as source server with a pointer to a list of destination servers for the probe module. Note here that a server can be a bare-metal server, VM, or container depending on the topology.

server1_uuid: [server2_uuid, server3_uuid]
server2_uuid: [server4_uuid]
server3_uuid: [server1_uuid, server4_uuid]

In some aspects, probe generator service 202 can expose endpoints that are shown in FIG. 25.

After a probe module that needs to be configured is determined, probe generation service 202 can publish a definition for the probe module on message bus 2116. The probe definition may be persisted in probe definition database 2138. Probe definition database 2138 can store the probe definitions should it be desirable to perform analysis of a probe definition to determine if it was correctly generated, and if the probe modules were properly configured and pushed to their ultimate destination. Further, probe definitions database 2138 can store a state of probe generation, configuration, and distribution. If it later becomes desirable to disable a probe module, information in probe definitions database can be used to properly disable the probe module and update the state of probe distribution for an application.

There may be many types of probe modules available in a network system. In some cases, device or system manufacturers may provide probe modules that are proprietary to their devices. In other cases, probe modules for a device or component may be available via open source or other mechanism. Probe configuration service 204 can receive a probe definition and is responsible for translating the desired probe intent (as expressed in the probe definition) to a specific probe configuration based on the actual probe service. In some aspects, probe configuration service 204 can have a plugin architecture, where plugins can adapt the probe configuration services for a particular type of probe module.

In the example shown in FIG. 21, probe configuration service 204 includes probe compiler plugins 2122A-2122N and probe configuration plugins 2124A-2124N. A probe compiler plugin 2122 receives a probe definition, and compiles the probe definition into a probe configuration for a particular type of probe module. Probe configuration plugin 2124 can receive the configuration (as configuration data) from its corresponding probe compiler plugin 2122, and push (e.g., send or transmit) the configuration to the appropriate probe module. As an example, the Netrounds test and service assurance platform available from Juniper Networks, Inc. of provides various types of probe modules.

In this example, probe compiler plugin 2122A may receive a probe definition (as configuration data), and compile the probe definition into a configuration that is adapted for a Netrounds probe module. Corresponding probe configuration plugin 2124A may receive the probe configuration (as configuration data) from probe compiler plugin 2122A, and send the probe configuration data to the appropriate Netrounds probe modules. Similarly, other probe modules (e.g., custom probe modules or probe modules from other vendors) are present for generating probe modules, then other probe compilers 2122 and corresponding probe configuration plugins can be provided to probe configuration service 204 that can generate and provide probe configurations data to their corresponding probe modules.

In some aspects, a probe module is associated with the application. The system can use such associations to determine applications that may be affected by an anomaly detected by the system. For example, assume a probe module returns telemetry data that indicates an anomaly. The system can identify the application associated with the probe module as potentially being affected by the anomaly.

In some aspects, probe configuration service 204 can send the probe configuration data directly to the appropriate probe modules. In some aspects, probe configuration service can send the probe configurations to probe control services 206, which in turn can send the probe configurations to their appropriate probe modules.

In this respect, various aspects of the techniques described above, enable the network system shown in FIG. 21, to determine a topology graph for a network, where the topology graph representing a plurality of logical layers of the network. Topology service 2110 may receive an identifier associated with an application utilizing the network for communications. Topology service 2110 may determine, based on the topology graph, a subgraph of the topology graph based on a location, in the topology graph, of a node representing a compute node that is a host of the application. Probe generation service 202 may determine, based on the subgraph, a set of one or more probe modules to measure performance metrics associated with network communication associated with the application, and for each of the one or more probe modules, generate configuration data corresponding to a type of the probe module. Probe generator service 202 may output, to the probe module, the configuration data corresponding to the probe module.

Figure 22:
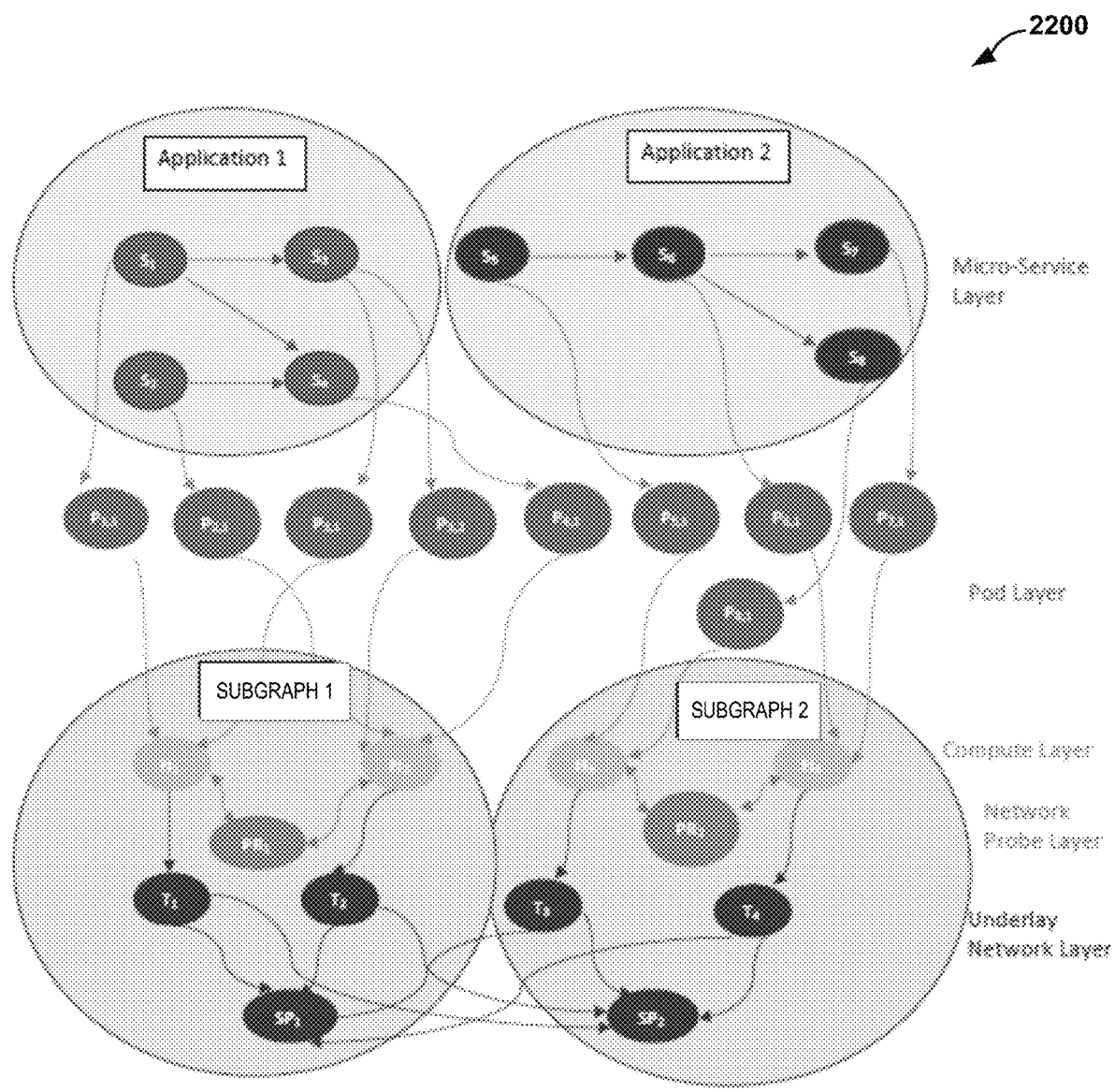
FIG. 22 is a conceptual diagram illustrating an example knowledge graph, having nodes across multiple layers of a network topology, in accordance with techniques of the disclosure.

FIG. 22 is a conceptual diagram illustrating an example knowledge graph 2200, having nodes across multiple layers of a network topology, including nodes representing probe modules associated with applications. These layers include a microservice layer, a pod layer, a computer layer, a network probe layer, and an underlay network layer. In the example shown in FIG. 22, two distinct microservice applications 1 and 2 are mapped to set of nodes in a network region that are responsible for a given application. As shown in the example of FIG. 22, application location service 2118 has determined that Application 1 is mapped to subregion 1 of a network topology and Application 2 is mapped to subregion 2 of the network topology. The mapping of applications to a network subregion can be used by probe generator service 202 to determine a set of probe modules that are to be configured to probe the region of the network in an application-aware manner. As seen, probe module $PR_1$ is used to measure network performance of network subregion 1 between host 1 ($H_1$) and host 2 ($H_2$). Probe module $PR_2$ is used to measure the performance of network subregion 2 between host 3 ($H_3$) and host 4 ($H_4$). Note that depending on the application deployment scenario, multiple applications can share the same network. Hence, the same set of network probe modules can be used to measure the performance of network from all of the multiple applications perspective.

Returning to FIG. 2, telemetry services 207 includes services that collect telemetry from probe modules across multiple layers of networked system such as system 2 of FIG. 1. As used herein, a layer can refer to a set of components (real or virtual) that use resources and services provided by another set of components at a different layer. In cases where a first component uses resources or services of a second component, the first component can be said to be dependent on the second component. For example, applications at an application layer may use resources and services of a compute node at a compute node layer. The compute node layer may, in turn, use resources and services provided by network devices at a network layer, and so on. Thus, applications at the application layer are dependent on compute nodes at a compute node layer, which in turn, may be dependent on physical network devices at the physical layer.

In some aspects, telemetry services 207 include telemetry collector 216, network telemetry collector 212, and device/fabric telemetry collector 214. Telemetry collector 216 can collect application telemetry 208 such as application performance data. Application telemetry may be collected using service-mesh, Istio, etc. Telemetry collector 216 can also collect compute/pod telemetry 210. Compute/pod telemetry 210 can include Kubernetes pod and node performance telemetry data such as central processor unit (CPU) usage, memory usage, network statistics, etc. In some aspects, telemetry collector 212 can be implemented using the Prometheus monitoring system combined with the Thanos high availability and data storage systems. Both Prometheus and Thanos are open source components.

Network telemetry collector 212 can collect telemetry data that measure end-to-end network performance. For example, network telemetry collector 212 can collect network performance measurements obtained or created by probe modules 19. Device/fabric telemetry collector 214 can collect telemetry data from network devices in a network fabric of network system 2 (e.g., network devices 18).

Event streaming engine 218 can receive telemetry data collected by telemetry services 207 such as telemetry collector 216, network telemetry collector 212, device telemetry collector 214 and others, and can store the data as time series data in time series database (TSDB) 238. The data received from telemetry services 207 may be in different formats depending on the source of the telemetry data and the collector used to collect the telemetry data. In some aspects, data transformer 232 apply data transforms to input data to normalize the data and/or to put the data into a standardized format. In some aspects, the data is transformed to an openTSDB format. In some aspects, event streaming engine 218 may be implemented, at least in part, using the Kafka stream processing system.

Event streaming engine may apply alarm rules 234 to the incoming telemetry data. Alarm rules 234 can be a set of one or more rules that indicate telemetry values that are anomalous, e.g., outside of desired ranges, over or under limits, etc.

Anomaly detector 236 can apply machine learning (ML) model 240 to time series of telemetry data from TSDB 238 to determine anomalous conditions related to the time series of telemetry data. In some aspects, ML model 240 can be trained using supervised or unsupervised learning techniques to discover relationships between KPIs in telemetry data and anomalous conditions within one or more layers of a multi-layered network system such as system 2 of FIG. 1. These relationships can be across multiple layers of the network model. For example, KPIs that are associated with a network device can be related to KPIs of an application that utilizes the network device to communicate with another service. As an example, KPIs that indicate a bottleneck at a network device or CPU overload on a host device can affect response time KPIs of an application that runs on the host and/or utilizes the network device for communication with another endpoint in the network.

Figure 23:
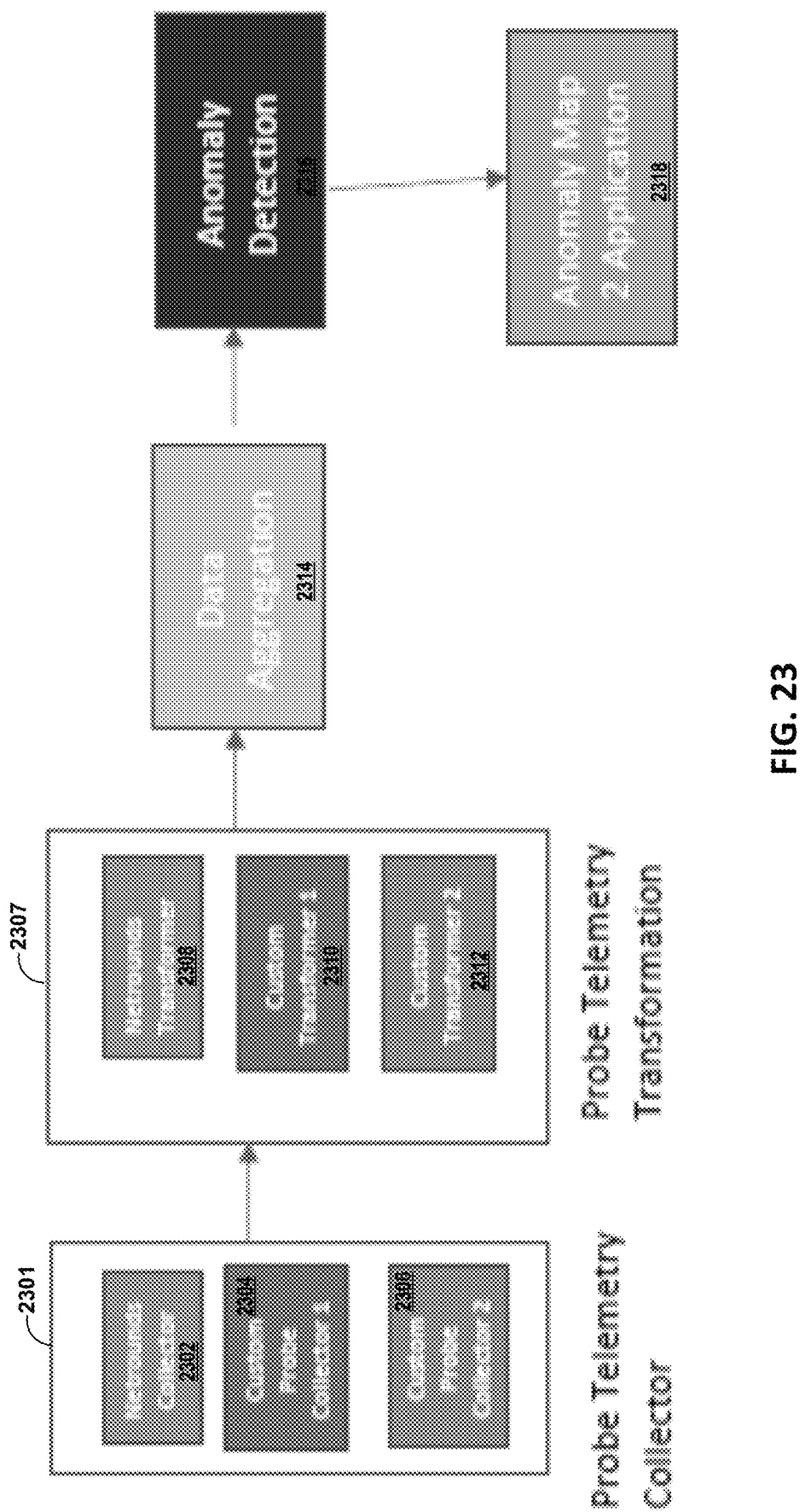
FIG. 23 is a block diagram illustrating a data pipeline for application-aware telemetry processing, in accordance with techniques of the disclosure.

FIG. 23 is a block diagram illustrating a data pipeline for application-aware telemetry processing. The data pipeline can include one or more probe telemetry collectors 2301, one or more probe telemetry transformers 2307, data aggregation 2314, anomaly detection 2316, and anomaly map 2 application 2318. A probe telemetry collector supports collection of telemetry for different types of probing services such as Netrounds probe modules, custom probe modules, etc. In general, a probe telemetry collector can be an instance of any of the collectors that provide telemetry services 207 (FIG. 2). Probe telemetry collector 2301 can support multiple plugins to collect telemetry from different sources. In the example shown in FIG. 23, probe telemetry collector 2301 includes a Netrounds collector 2362, a first custom probe collector 2304, and a second custom probe collector 2306.

Probe telemetry transformation 2307 can transform data collected from corresponding telemetry collectors 2301. Probe telemetry transformation may be an implementation of data transformer 232 of FIG. 2. Data from different probe collectors may arrive in different formats. As a result, input data in an input format are transformed to a standard telemetry format by a corresponding data transformer plugin. For example, Netrounds transformer 2308 is used to transform the raw data collected by Netrounds collector 2302. Similarly, custom transformers 2310 and 2312 are used to transform probe data collected by custom probe collectors 2304 and 2306 respectively.

Data Aggregation 2314 is a stage of the pipeline responsible for aggregating probe module data at different granularity. For example, data aggregation 2314 may aggregate probe telemetry data at per compute node, which aggregates probe telemetry data for all probe modules configured on a given computer node. Similarly, probe telemetry data across all servers under a Top-of-Rack (ToR) switch are aggregated to provide a health of the network from ToR perspective. At higher granularity, probe telemetry data across a group of ToR switches is combined to generate a ToR group baseline from network perspective such as latency 95 percentile, loss 95 percentile, delay variation.

Anomaly detection 2316 uses machine learning and rule based approaches to determine any anomalous behavior in the KPIs determined in the data aggregation layer 2314 of the pipeline. For example, if latency and loss profile of the network deviates significantly from the baseline behavior then an anomaly signal is generated by this service. Anomaly detection 2316 is triggered for data aggregated at different granularity, e.g., server, group of servers under Leaf Node (ToR) switch, etc. Anomaly detection 2316 may be an implementation of anomaly detector 236 of FIG. 2.

Map Anomaly from Network to Application 2318 ("Anomaly Map 2 Application 2318") creates a snapshot of an application and its mapping on the underlying infrastructure. Once end-to-end health of network health is determined at different granularities, the framework system proposes a graph based method for mapping network anomalies to the applications that may get impacted because of the anomaly in the end-to-end behavior in certain region of the network. This requires the creation of snapshot of application and its mapping on the underlying infrastructure in the form of a knowledge graph. Once a knowledge graph is constructed then a set of queries on the knowledge graph will be able to determine nodes in the application layer that will be impacted by any anomaly in the underlying network layer.

Figure 24:
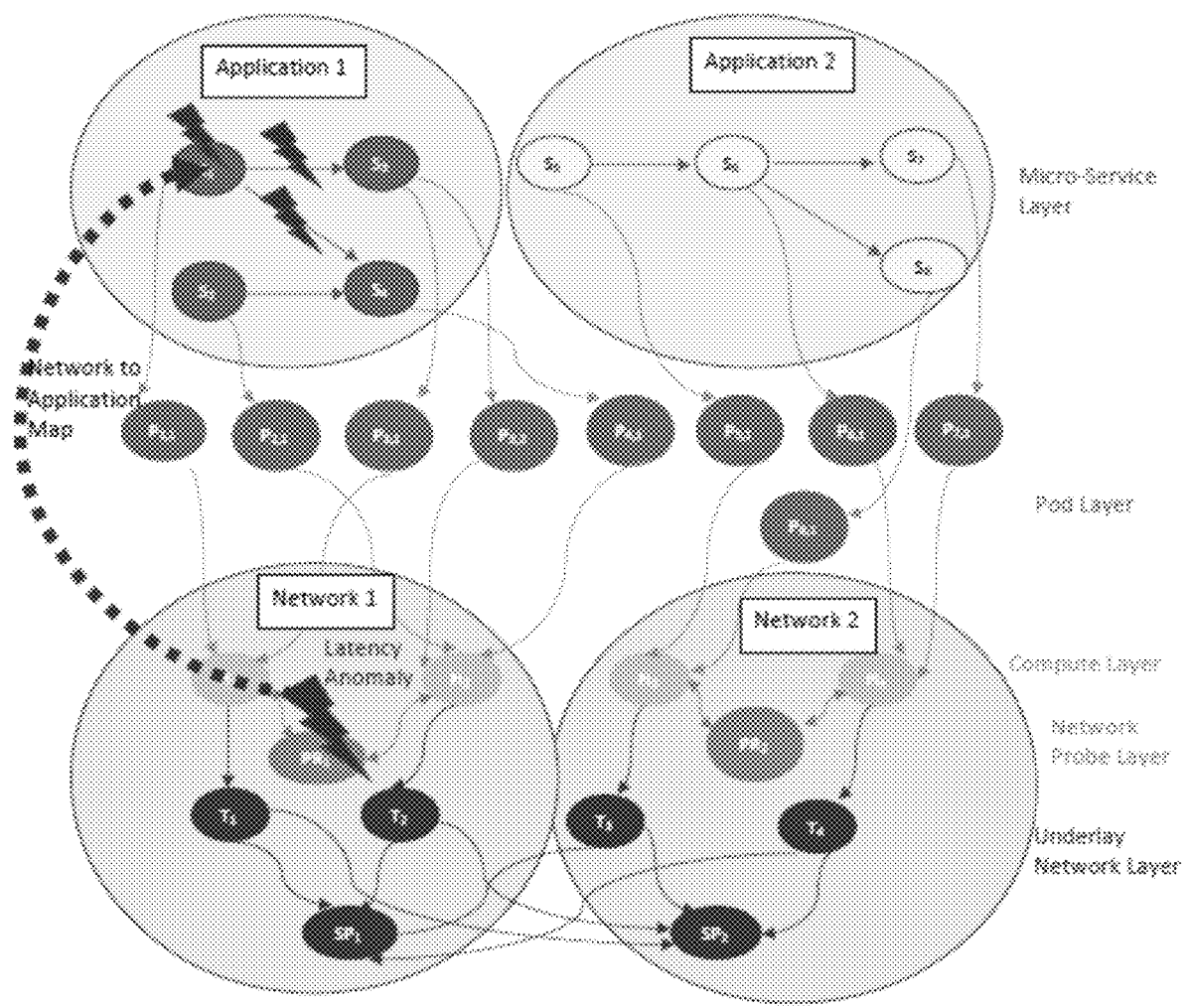
FIG. 24 is a conceptual diagram illustrating an example of mapping an anomaly for an application, in accordance with techniques of the disclosure.

FIG. 24 is a conceptual diagram illustrating an example of mapping an anomaly for an application. In the example shown in FIG. 24, an anomaly detected using telemetry data from probe module PR1 associated with Application 1 is mapped to Application 1 service S1 and Service calls edges S1-S3 and S1-S4 using the association of probe module PR1 with Application 1.

Figure 26:
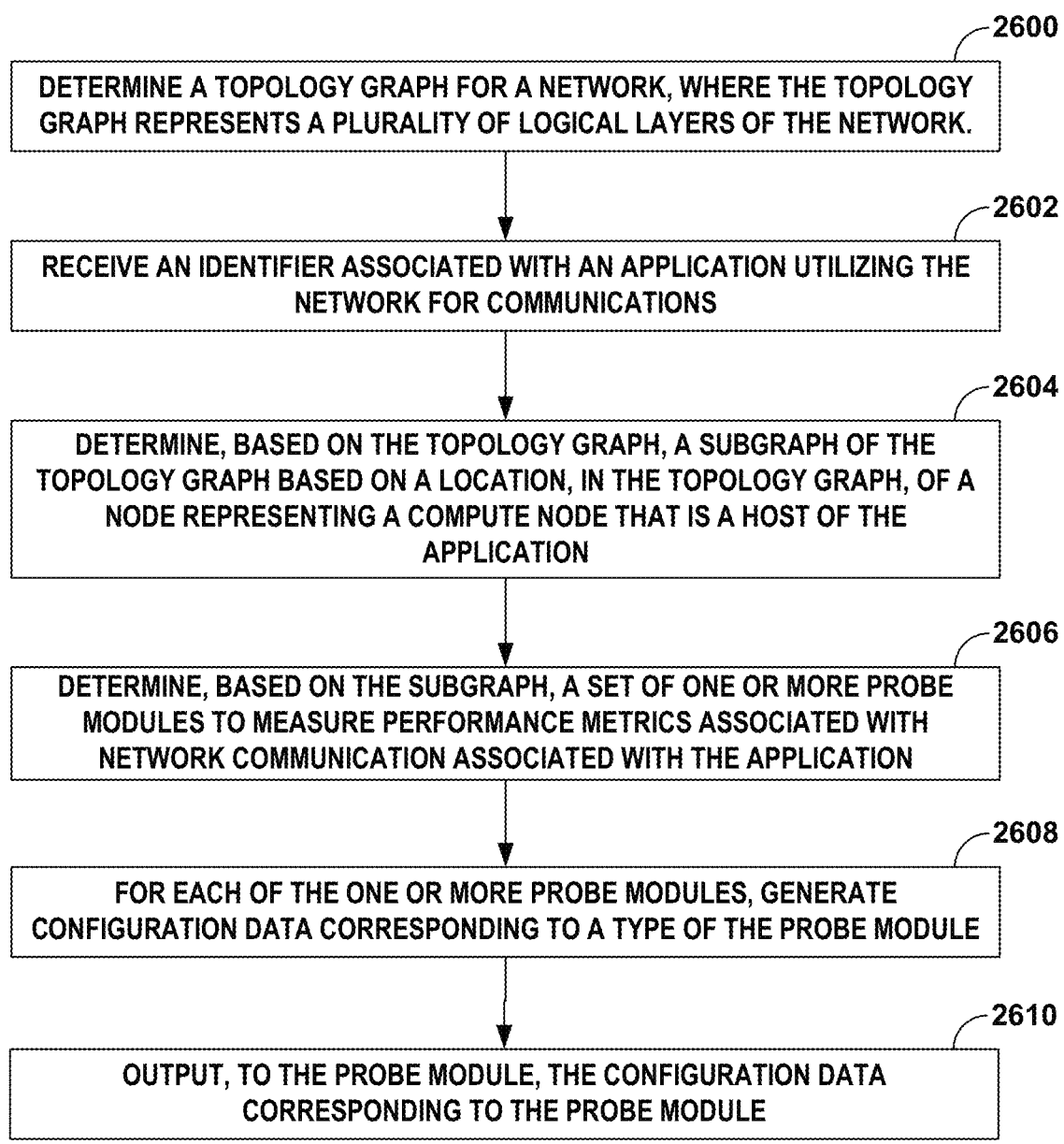
FIG. 26 is a flowchart illustrating example operation of the network system in performing various aspects of the application-aware active measurement techniques.

FIG. 26 is a flowchart illustrating example operation of the network system in performing various aspects of the application-aware active measurement techniques. The network system shown in FIG. 21 may determine a topology graph for a network, where the topology graph represents a plurality of logical layers of the network (2600). Topology service 2110 may receive an identifier associated with an application utilizing the network for communications (2602). Topology service 2110 may determine, based on the topology graph, a subgraph of the topology graph based on a location, in the topology graph, of a node representing a compute node that is a host of the application (2604). Probe generation service 202 may determine, based on the subgraph, a set of one or more probe modules to measure performance metrics associated with network communication associated with the application (2606), and for each of the one or more probe modules, generate configuration data corresponding to a type of the probe module (2608). Probe generator service 202 may output, to the probe module, the configuration data corresponding to the probe module (2610).

Telemetry services 207 includes services that collect telemetry from probe modules across multiple layers of networked system such as system 2 of FIG. 1. As used herein, a layer can refer to a set of components (real or virtual) that use resources and services provided by another set of components at a different layer. In cases where a first component uses resources or services of a second component, the first component can be said to be dependent on the second component. For example, applications at an application layer may use resources and services of a compute node at a compute node layer. The compute node layer may, in turn, use resources and services provided by network devices at a network layer, and so on. Thus, applications at the application layer are dependent on compute nodes at a compute node layer, which in turn, may be dependent on physical network devices (e.g., compute nodes 10 shown in the example of FIG. 1) at the network physical layer.

In some aspects, telemetry services 207 include telemetry collector 216, network telemetry collector 212, and device/fabric telemetry collector 214. Telemetry collector 216 can collect application telemetry 208 such as application performance data. Application telemetry may be collected using service-mesh, Istio, etc. Telemetry collector 216 can also collect compute/pod telemetry 210. Compute/pod telemetry 210 can include Kubernetes pod and node performance telemetry data such as central processor unit (CPU) usage, memory usage, network statistics, etc. In some aspects, telemetry collector 212 can be implemented using the Prometheus monitoring system combined with the Thanos high availability and data storage systems. Both Prometheus and Thanos are open source components.

Network telemetry collector 212 can collect telemetry data that measure end-to-end network performance. For example, network telemetry collector 212 can collect network performance measurements obtained or created by probe modules 19.

Device/fabric telemetry collector 214 can collect telemetry data from network devices in a network fabric of network system 2 (e.g., network devices 18).

Event streaming engine 218 can receive telemetry data collected by telemetry services 207 such as telemetry collector 216, network telemetry collector 212, device telemetry collector 214 and others, and can store the data as time series data in time series database (TSDB) 238. The data received from telemetry services 207 may be in different formats depending on the source of the telemetry data and the collector used to collect the telemetry data. In some aspects, data transformer 232 apply data transforms to input data to normalize the data and/or to put the data into a standardized format. In some aspects, the data is transformed to an openTSDB format. In some aspects, event streaming engine 218 may be implemented, at least in part, using the Kafka stream processing system.

Event streaming engine may apply alarm rules 234 to the incoming telemetry data. Alarm rules 234 may represent a set of one or more rules that indicate telemetry values that are anomalous, e.g., outside of desired ranges, over or under limits, etc.

Anomaly detector 236 can apply machine learning (ML) model 241 to time series of telemetry data from TSDB 238 to determine anomalous conditions related to the time series of telemetry data. In some aspects, ML model 241 can be trained using supervised or unsupervised learning techniques to discover relationships between KPIs in telemetry data and anomalous conditions within one or more layers of a multi-layered network system such as system 2 of FIG. 1. These relationships can be across multiple layers of the network model. For example, KPIs that are associated with a network device can be related to KPIs of an application that utilizes the network device to communicate with another service. As an example, KPIs that indicate a bottleneck at a network device or CPU overload on a host device can affect response time KPIs of an application that runs on the host and/or utilizes the network device for communication with another endpoint in the network.

Figure 3:
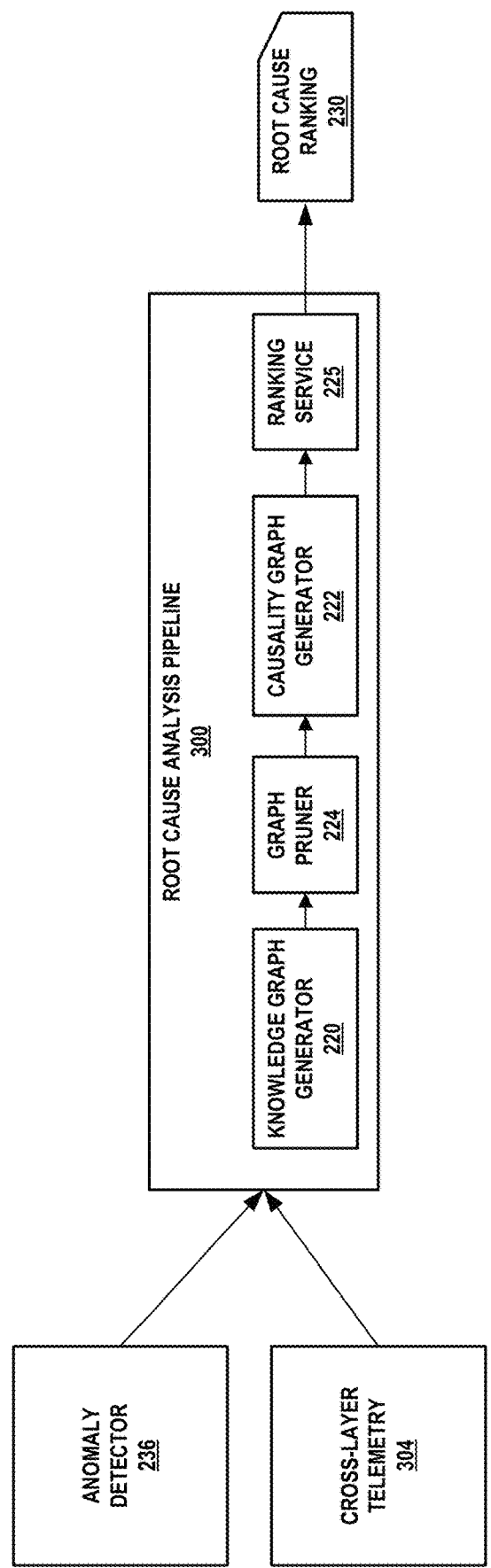
FIG. 3 is a block diagram illustrating a root cause analysis pipeline, in accordance with aspects of the disclosure.

Anomaly detector 236 may invoke fault localizer 240 when a fault (e.g., an anomalous condition) is detected using alarm rules or detected using ML model 241. In some aspects, fault localizer 240 includes knowledge graph generator 220, causal graph generator 222, graph pruner 224 and ranking service 225. In some aspects, knowledge graph generator 220, causal graph generator 222, graph pruner 224, and ranking service 225 may be executed as part of a root cause analysis pipeline, an example of which is shown in FIG. 3.

Knowledge graph generator 220 can generate, based on data in TSDB 238 and relationships discovered in ML model 241, dependencies between different application and infrastructure entities of network system 2. Causal graph generator 222 generates further graph data on top of a knowledge graph generated by knowledge graph generator 220 to form a causal graph. The causal graph captures causal relationships between different performance KPIs and anomalous conditions. Graph pruner 224 prunes the knowledge graph and causal graph to determine a subset of the graphs to be used in root cause localization. Ranking service 225 ranks the nodes in the causal graph and to indicate the nodes that are likely to be the root cause of an observed anomaly in the order of likelihood that the node caused the anomaly.

Root cause analysis framework system 200 may further include graph analytics service 226 and user interface (UI) 228. Graph analytics system 226 can receive graph queries on the knowledge and causality graph for further investigation and validation of fault localization results. In some aspects, graph analytics system 226 can be used to perform alarm propagation path analysis, graph change analysis, fault injection analysis, or application-to-network mapping analysis. Further details on graph analytics system 226 will now be provided with respect to FIGS. 14-16, 17A, 17B, 8 and 19A-19C.

Alarm Propagation Path Analysis

A goal of alarm propagation path analysis is to determine the propagation path of alarms across different layers in the knowledge graph that can explain different symptoms (e.g., anomalies) observed in the dependent layers.

Figure 14:
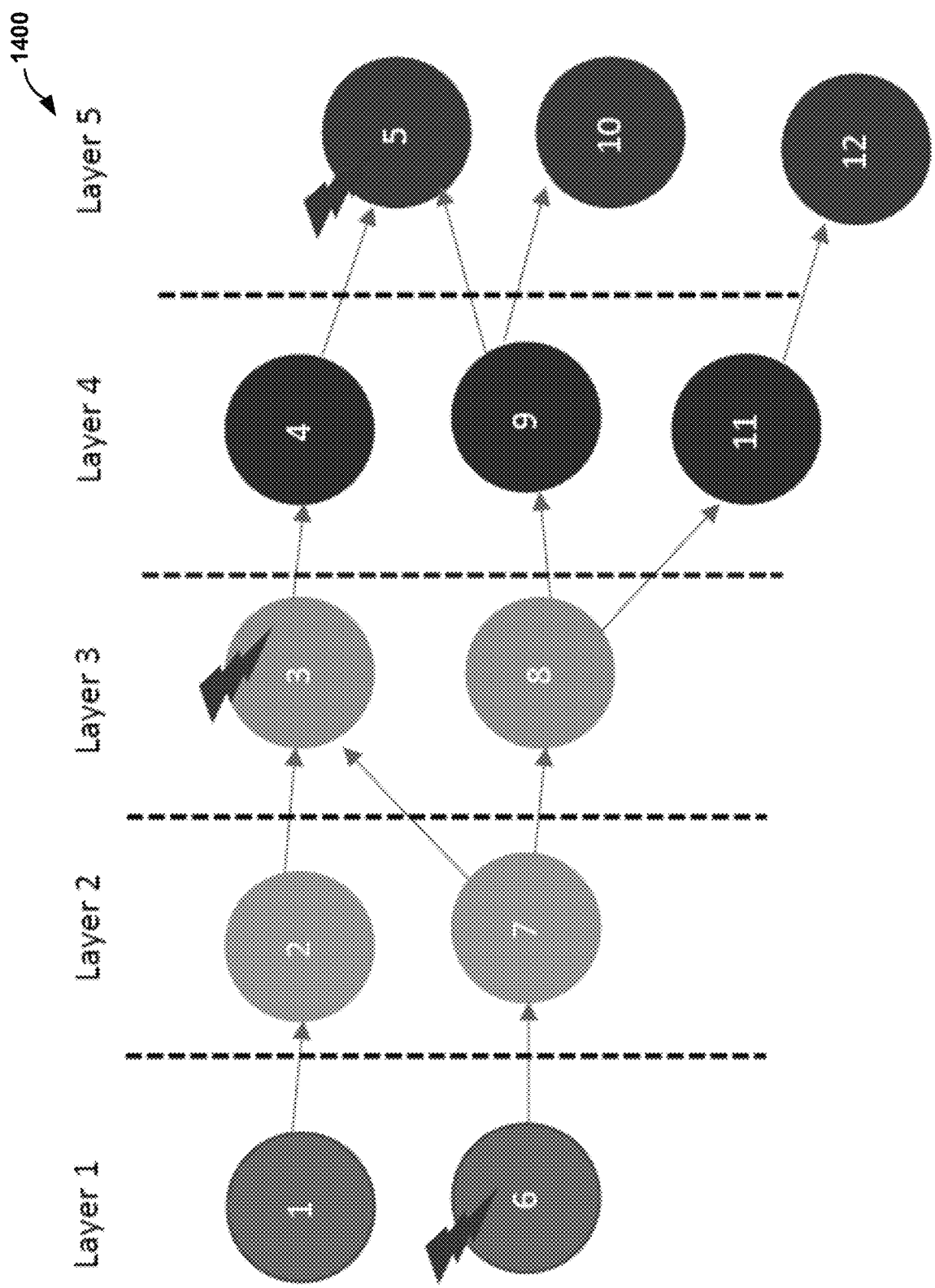
FIG. 14 is a conceptual diagram of an example knowledge graph showing anomaly alarms detected at multiple layers in the graph.

FIG. 14 is a conceptual diagram of an example knowledge graph showing anomaly alarms detected at multiple layers in the graph. Knowledge graph generator 220 may create the example knowledge graph 1400 comprising a plurality of first nodes (e.g., Layer 1 nodes 1 and 6) in the network system referenced in the time series data. The first nodes may represent elements residing at one or more of a plurality of layers (e.g., Layers 1-5) associated with the network system, wherein edges between two nodes of the plurality of nodes indicate a communication or computing dependency between the two nodes.

In this example, graph analytics service 226 performs analysis of the graph topology to determine the propagation path of anomaly alarms that can explain the symptom alarm detected at node 6. In some aspects, the static analysis includes top-down analysis and/or bottom-up analysis. For example, analysis framework system 200 can be configured to analyze the graph topology in a top-down or bottom-up manner as described herein. Top-down analysis of a graph can be useful to determine why an application is executing slower than expected. Bottom-up analysis can be useful to determine what applications may be affected if a compute-node or network node detects an anomaly.

Graph analytics service 226 may receive a graph analysis request, which may include one or more of a request to determine a fault propagation path, a request to determine an impact of an emulated fault, or a request to determine an application-to-network path. Graph analytics service 226 may determine a response to the graph analysis request and output a response to the graph analysis request.

Figure 15:
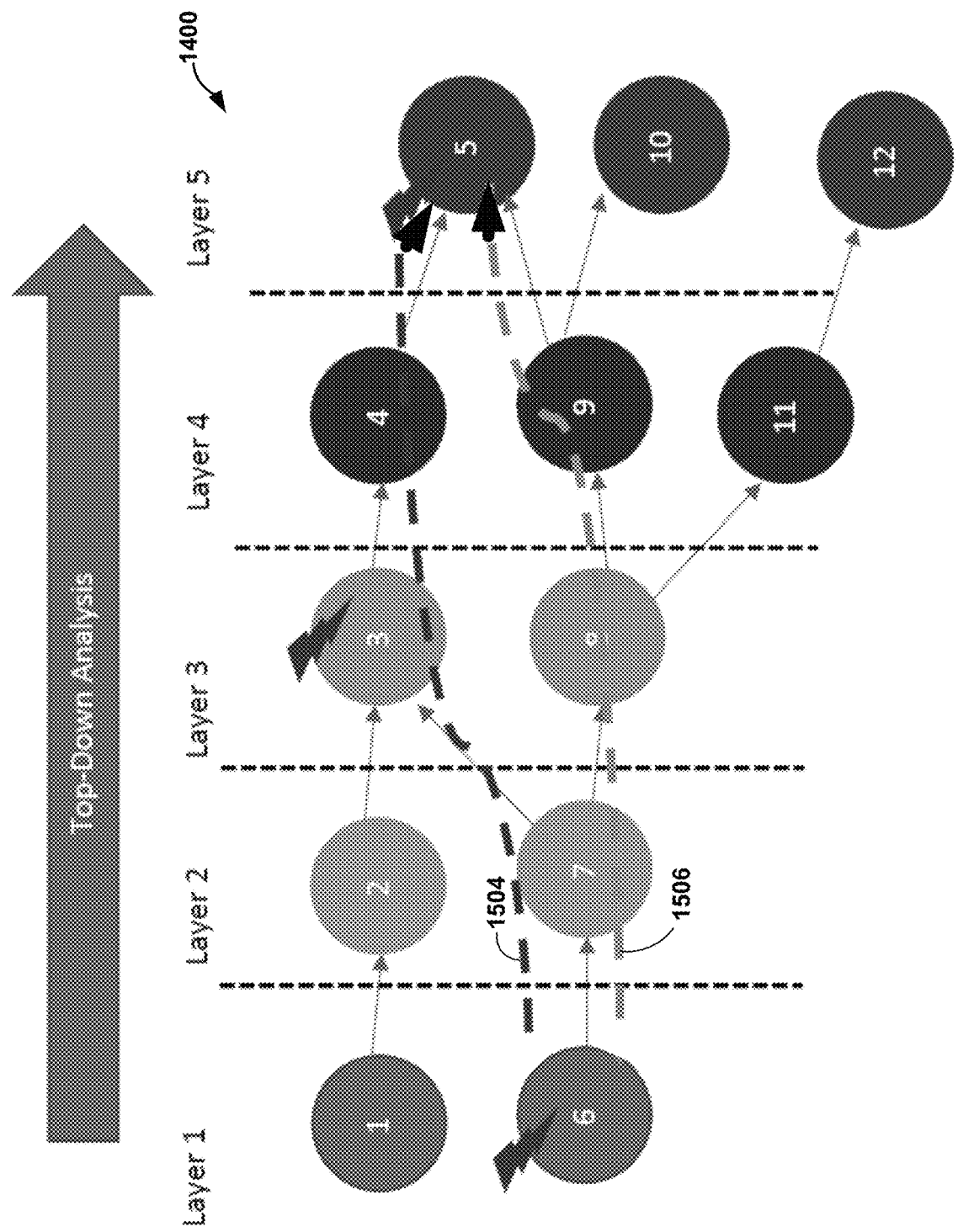
FIG. 15 is a conceptual diagram that illustrates top-down analysis of the knowledge graph of FIG. 14.

FIG. 15 is a conceptual diagram that illustrates top-down analysis of the knowledge graph of FIG. 14. The top-down analysis of FIG. 15 may be performed, for example, by graph analytics service 226 of FIG. 2. In top-down analysis, graph analytics service 226 executes graph analytics queries on the graph starting from the dependent node that detected an anomaly for which an alarm may be raised. In the example shown in FIG. 15, node 6 is the dependent node for which alarm propagation analysis is performed. For example, node 6 may be node representing an application for which an alarm has been issued regarding application performance. For example, anomaly detector 236 of FIG. 2 or other monitoring system may issue an alarm in response to potential anomalies in the network system.

In the example shown in FIG. 15, top-down analysis, e.g., by the framework system 200, determines two possible paths (indicated by dotted lines 1504 and 1506) through which an anomaly could have propagated from the nodes in Layer 5 to nodes in Layer 1. Once the possible paths are determined, graph pruner 224 may perform further pruning of the candidate paths by selecting only those paths that have intermediate nodes having detected anomalies. In this case path 1504 is the more likely path for anomaly propagation because Node 3 in the path also shows an anomaly related to its KPI (key performance indicator) metric.

In this instance, the graph analysis request includes the request to determine the fault propagation path. In response to the request to determine the fault propagation path, graph analysis service 226 may determine, based on the time series data stored to TSDB 238, a first node and a second node that are each experiencing a fault, the first node dependent on the second node. Graph analysis service 226 may traverse knowledge graph 1400 to determine one or more paths through the knowledge graph from the first node to the second node, and select, as a fault propagation path, a path (e.g., path 1504) of the one or more paths (e.g., paths 1504 and 1506) where an intermediate node (e.g., node 3) in the path between the first node and the second node is experiencing a fault. Graph analysis service 226 may output the fault propagation path (e.g., via UI 228).

In this instance of top-down analysis, the request may identifies the first node (e.g., node 6), and graph analysis service 226 traverses knowledge graph 1400 from the first node (e.g., node 6) to the second node (e.g., node 5). In bottom-up analysis shown in the example of FIG. 16, the request includes an identification of the second node (e.g., node 5), and graph analysis system 226 may traverse knowledge graph 1400 from the second node (e.g., node 5) to the first node (e.g., node 6).

Figure 16:
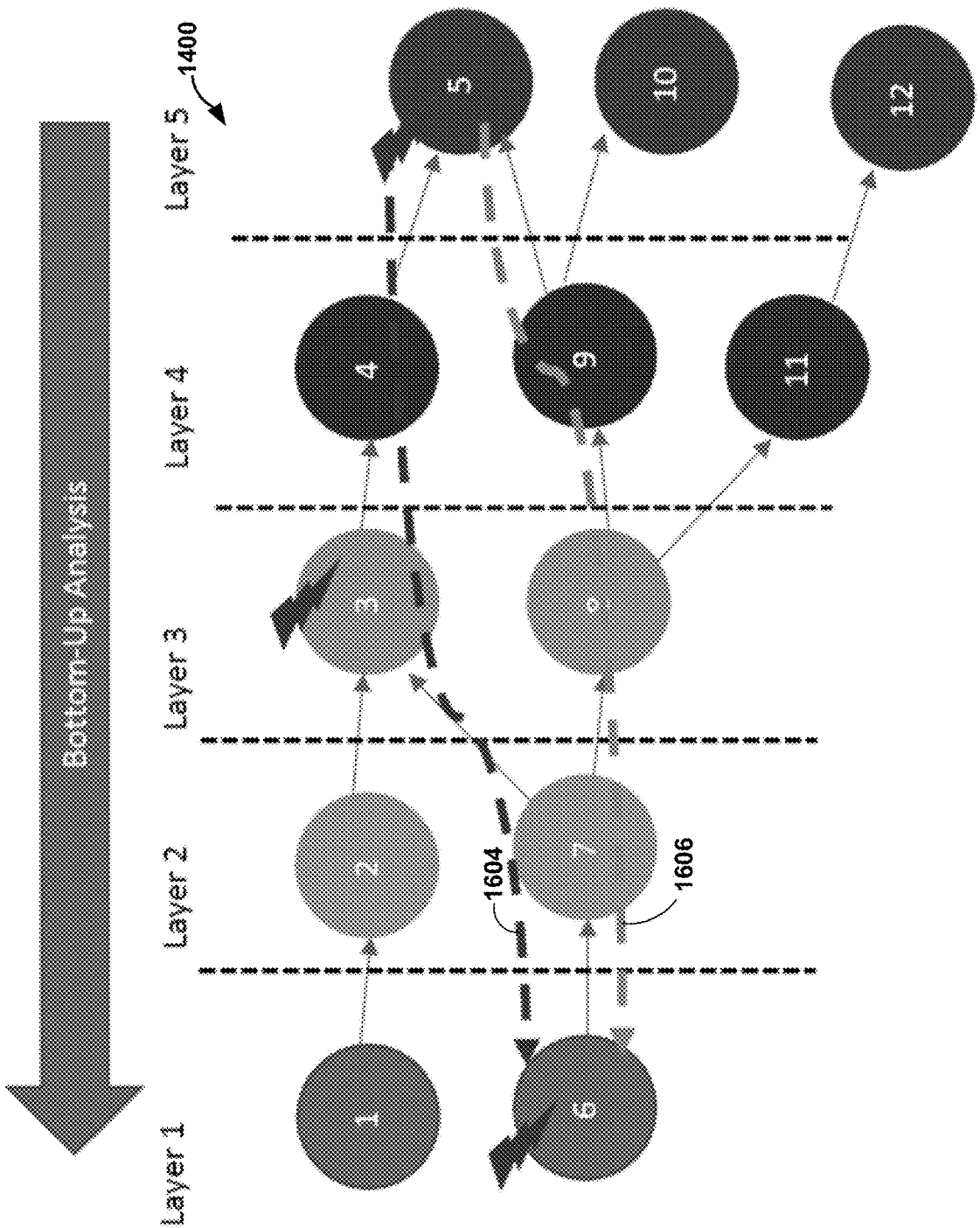
FIG. 16 is a conceptual diagram that illustrates bottom-up analysis of the knowledge graph of FIG. 14.

FIG. 16 is a conceptual diagram that illustrates bottom-up analysis of the knowledge graph of FIG. 14. In the example shown in FIG. 16, graph analytics service 226 receives a request to perform bottom-up analysis, alarm propagation analysis starting at node 5 on which other layer nodes are dependent. Graph analytics service 226 traverses the knowledge graph to find possible paths from Node 5 to Node 6 in the graph. Note that in this example, the output of graph analytics service 226 using both the top-down and bottom-up approach is the same, where paths 1604 and 1606 are determined through which alarm propagation can happen, and are the same as paths 1504 and 1506 of FIG. 15. Similar to the top-down approach described above, graph pruner module 224 performs further pruning of the candidate paths by selecting only those paths that have intermediate nodes for which anomalies have also been detected. In this case path 1604 is the more likely path for anomaly propagation as intermediate node (e.g., node 3) in the path also shows an anomaly related to its KPI metrics.

FIG. 19A is a conceptual diagram that illustrates an API exposed by a graph analytics service. The API for graph analytics service 226 may be used to initiate alarm propagation analysis for a graph and for retrieving the paths through which an observed anomaly can propagate to an application layer.

Graph change analysis enables determining changes in the application-to-network topology with time. Knowledge graph generator 220 generates a knowledge graph for a given monitoring window, which captures relationship between an application and its underlying infrastructure components during that time window. The knowledge graph also captures all the alarms related to performance metrics for each node in the knowledge graph. When two such graphs are created for adjacent time window, graph analytics service 226, in response to a request, may perform graph change analysis to answer the following example questions:
1. How has application layer evolved within the two adjacent time windows?
2. How is underlying compute layer evolved between two adjacent time windows?
3. How is the health of the network evolved between adjacent time windows?
4. How many new nodes/edges are added/deleted between two monitoring time windows?

5. How have alarms evolved/changed between two monitoring time windows across all layers in the graph?

Figure 17A:
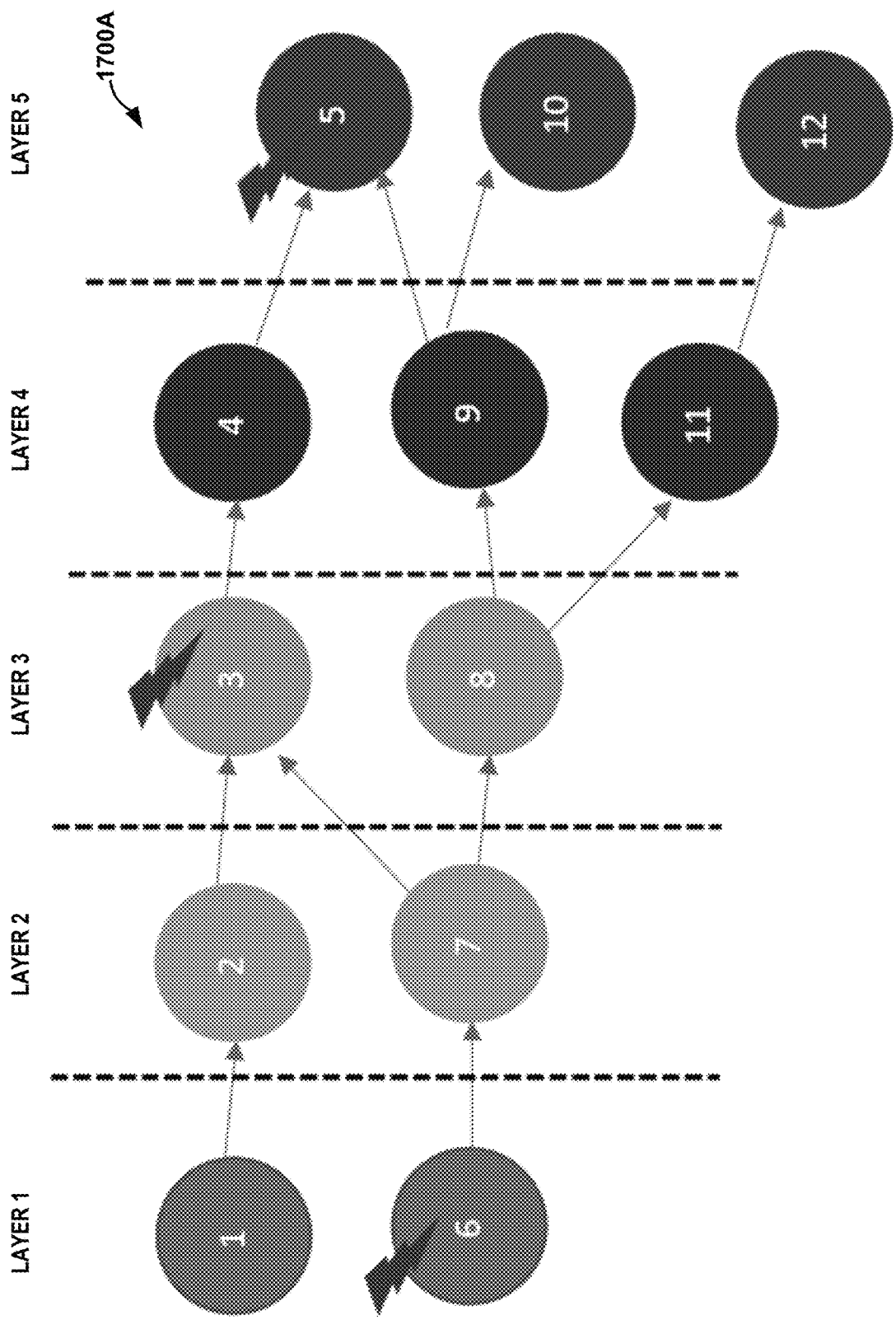
FIGS. 17A and 17B are conceptual diagrams illustrating two knowledge graphs showing how a graph evolves between two time windows.
Figure 17B:
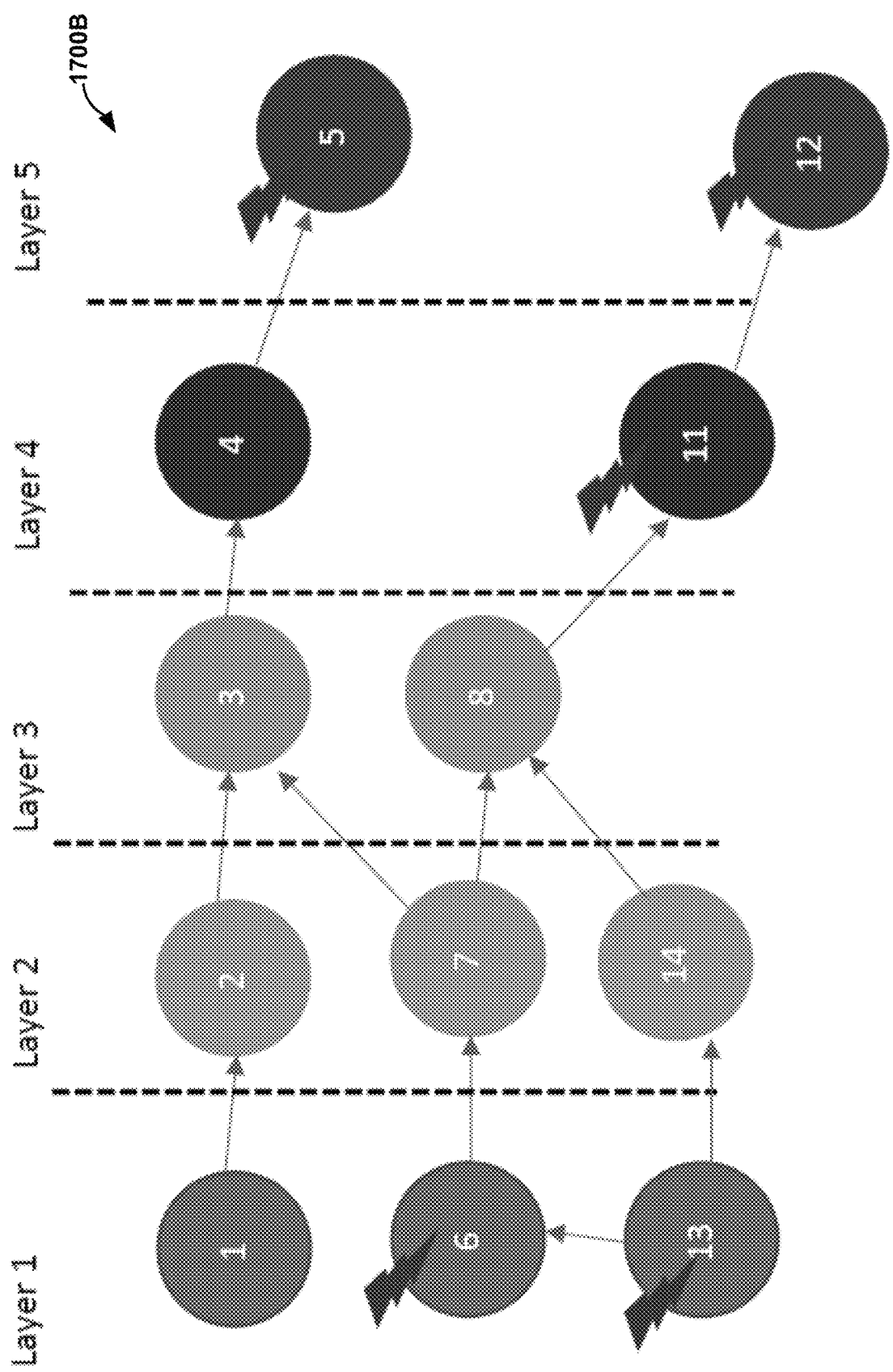

FIGS. 17A and 17B are conceptual diagrams illustrating two knowledge graphs generated by knowledge graph generator 220 showing how a graph evolves between two time windows. The example illustrated in FIGS. 17A and 17B shows per Layer analysis on what has changed between two graphs generated over two different monitoring windows. In this example, the graph of FIG. 17A represents an example knowledge graph for a time range T1-T2, and the graph of FIG. 17B represents an example knowledge graph for a time range of T2-T3. Graph analysis of the two graphs shows the following changes between time T1-T2 and time T2-T3:

Layer 1 (Application):
  Added Node: 13
  Deleted Node: None
  Added Edges: 13-6
  Deleted Edge: None
  Added Alarms: 13
  Resolved Alarms: None
Layer 2 (Application Instance Pod Layer):
  Added Node: 14
  Deleted Node: None
  Added Edge: 13-14
  Deleted Edge: None
  Added Alarm: None
  Resolved Alarm: None
Layer 3 (Computer Layer):
  Added Node: None
  Deleted Node: None
  Added Edge: None
  Deleted Edge: None
  Added Alarm: None
  Resolved Alarm: 3
Layer 4 (Network Probe Layer)
  Added Node: None
  Deleted Node: 9
  Added Edge: None
  Deleted Edge: 8-9
  Added Alarm: 11
  Resolved Alarm: None
Layer 5 (Network Device Layer):
  Added Node: None
  Deleted Node: 10
  Added Edge: None
  Deleted Edge: 9-10, 9-5
  Added Alarm: 12
  Resolved Alarm: None In this example, the graph analysis request comprises the request to determine changes in the graph, wherein the request identifies a first knowledge graph 1700A from a first time (e.g., T1-T2) and a second knowledge graph 1700B from a second time later than the first time (e.g., T2-T3). Graph analysis service 226 may, for each layer in knowledge graph 1700A, comparing the nodes and edges in the layer with the nodes and edges of the corresponding layer in knowledge graph 1700B and determining one or more differences (e.g., listed above) between the layer of knowledge graph 1700A and the corresponding layer of knowledge graph 1700B based on the comparison. Graph analysis service 226 may output (e.g., via UI 228) the one or more differences between the layer of knowledge graph 1700A and the corresponding layer of knowledge graph 1700B. As shown above, those differences may include one or more of an added node, a deleted node, an added edge, and/or a deleted edge.

FIG. 19B is a conceptual diagram that illustrates a set of APIs exposed by graph analytics service 226 that can be used to initiate graph change analysis and query the results of the graph change analysis.

This use case of graph analytics emulates fault injection in a specific layer in the knowledge graph and determines the impact of a catastrophic failure of the node on application layers. For example, this service helps answer the following questions:

1. What will be the impact of compute node failure on the application layer?
2. What will be the impact of increase in loss or latency between two servers on the application?

Graph analytics service 226 first emulates a fault injection in the knowledge graph. Depending on the node type, different faults can be injected on the node. Once a fault is injected then graph traversals are performed to determine upstream applications that may get impacted by the injection of specific fault at lower layers in the graph. The current example includes two types of faults: Compute Layer Faults and Network Layer Faults.

When a compute node fault is injected such as power failure, then this can lead to reprovisioning of the application nodes on different compute nodes. Graph traversal to application nodes prior to an actual fault can help determine which applications will get impacted whenever a power failure of specific nodes happens. This analysis is useful in assigning a risk score to each node in the compute layer based on its impact on the application layer.

When a network layer fault is injected based on a request to graph analytics service 226, such as a request to inject a latency spike or packet losses on network between two server pairs, then graph analytics service 226 traverses the knowledge graph to determine applications that are hosted on the impacted servers. This allows determination of a risk score of the network layer which is a function of how many instances of the applications will be impacted by the fault injection.

Node Fault Risk Score Evaluation:

Graph analytics service 226 can compute a risk score of different injected faults based on the degree of impact of the failure on the application layer. Consider an example of M microservices $S_m$ with $I_m$ instances respectively are hosted on a set of compute nodes. If a fault occurs in a compute or network layer impacts a subset of instances of the services, i.e., $F_m$ instances are impacted for service $S_m$. Then risk-score of a given fault is computed as follows:

$$RiskScore = \frac{1}{n}\sum_{m=1}^{M} \frac{F_m}{I_m}$$

RiskScore varies between 0-1, where the larger the score, more impact a given fault has on the application and its instances. A score of 1 indicates all applications and their corresponding instances will be impacted by a given node failure.

In this way, graph analysis service 226 may receive a graph analysis request including a request to determine the impact of the emulated fault. Graph analysis service 226 may also receive, possibly via the graph analysis request and/or via input entered by way of UI 228, an indication of a first node in the knowledge graph in which to emulate a fault. Graph analysis service 226 may next traverse the knowledge graph to determine one or more paths through the knowledge graph from the first node to one or more second nodes, each second node of the one or more second nodes representing a service of a plurality of services in the network system. Graph analysis service 226 may next determine a risk score based on a number of the one or more second nodes in the one or more paths and a total number of instances of the plurality of services, and output the risk score as the response to the graph analysis request.

Figure 18:
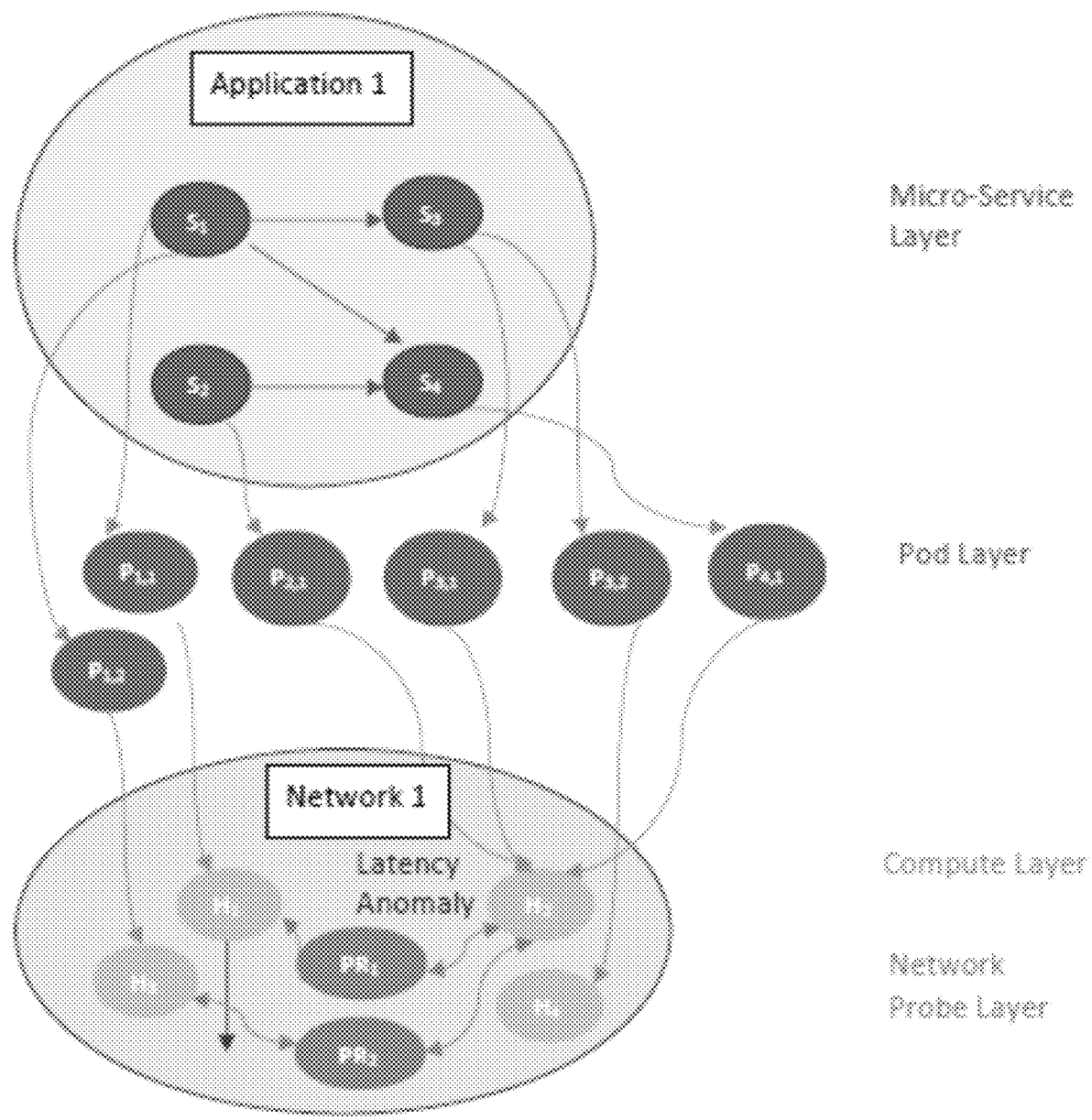
FIG. 18 is a conceptual diagram illustrating an example knowledge graph including a microservice based application.

The Application-to-Network Map service can determine the network region over which given micro-service to microservice communication is taking place. FIG. 18 is a conceptual diagram illustrating an example knowledge graph including a microservice based application. In the example shown in FIG. 18, microservices $S_1$ and $S_3$ are communicating with each other. Application-to-Network Map service performs a top-down graph traversal to determine candidate network endpoints over which communication between $S_1$ and $S_3$ occurs. As a first step, graph analytics service 226 determines instances of caller and callee services. In this case microservice $S_1$ has two instances, pods $P_{1,1}$ and $P_{1,2}$ that are hosted on compute nodes $H_1$ and $H_3$ (where denotes a "host") respectively. Similarly, callee service $S_3$ has two instances, pods $P_{3,1}$ and $P_{3,2}$ which are hosted on compute nodes $H_2$ and $H_4$ respectively. Next, graph analytics service 226 determines network nodes that are responsible for communication from compute node set $[H_1, H_3]$ to compute node set $[H_2, H_4]$. As seen in the graph of FIG. 18, network probe nodes $PR_1$ and $PR_2$ are a set of probe modules that are configured between these two sets of compute nodes. Probe modules $PR_1$ and $PR_2$ can analyze network traffic between compute nodes $[H_1, H_3]$ and $[H_2, H_4]$ to determine network endpoints that are communicating network traffic between services $S_1$ and $S_3$. This analysis can be useful in determining the source of an anomaly where communication between $S_1$ and $S_3$ is slower than expected. For example, the analysis can rule out network components if all of the network devices in the communication path are operating normally. Trouble shooting can then be focused on other components in the communications path (e.g., hosts $H_1$ and $H_2$) that may be the cause of the slower than expected performance.

In other words, graph analysis service 226 may receive a graph analysis request that includes the request to determine the application-to-network path and an identification of a first application ($S_1$) and a second application ($S_3$). Graph analysis service 226 may traverse the knowledge graph from a first node representing the first application to a second mode representing the second application to determine a path from the first node to the second node. The path may include one or more compute nodes and one or more network nodes. Graph analysis service 226 may output (e.g., via UI 228) identifiers corresponding to the one or more computing nodes and the one or more network nodes.

FIG. 19C is a conceptual diagram illustrating an API for performing an application-to-network map analysis.

Figure 20:
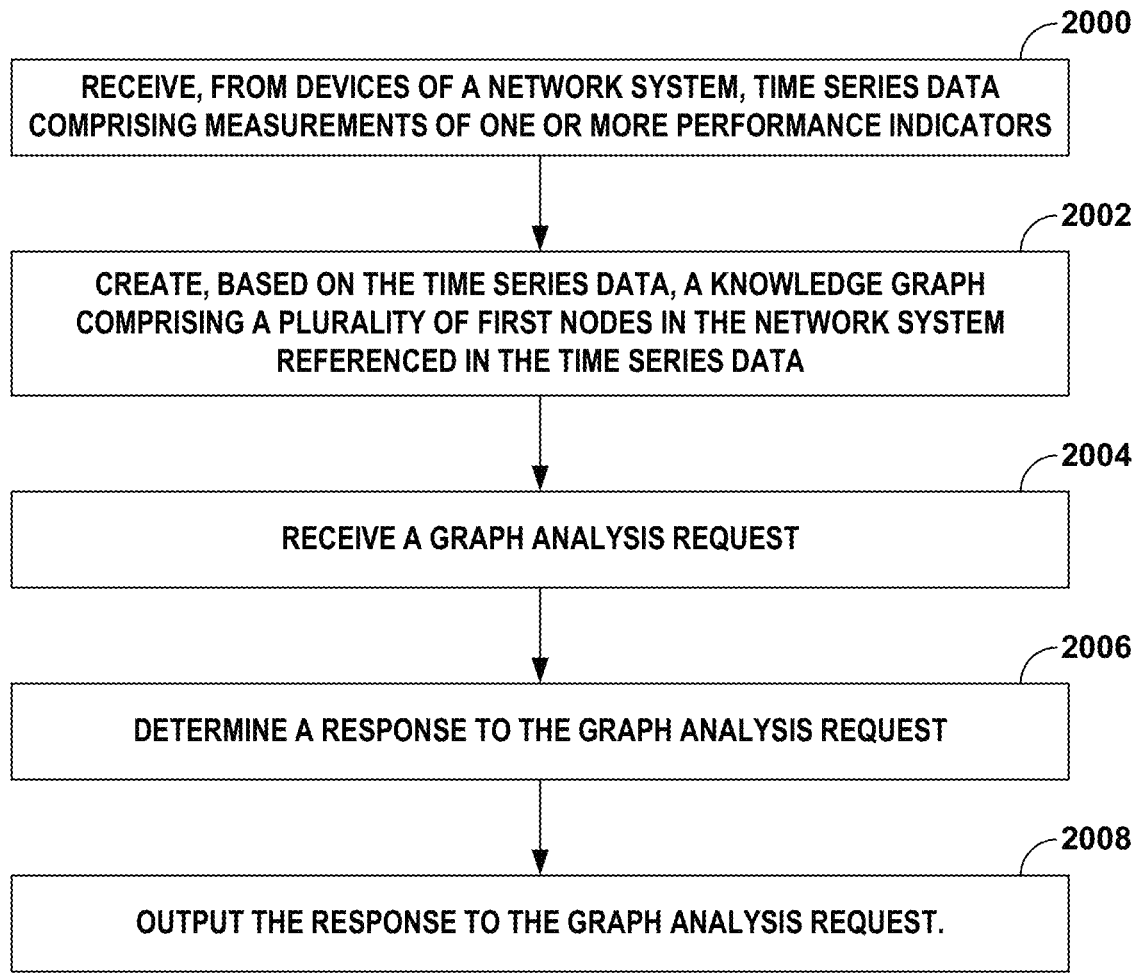
FIG. 20 is a flowchart illustrating example operation of the graph analysis service shown in the example of FIG. 2 in performing various aspects of the graph analytics techniques described in this disclosure.

FIG. 20 is a flowchart illustrating example operation of the graph analysis service shown in the example of FIG. 2 in performing various aspects of the graph analytics techniques described in this disclosure. Knowledge graph generator 220 may receive, from network devices in the network system, time series data (stored to TSDB 238) comprising measurements of one or more performance indicators (2000). Knowledge graph generator 220 may create, based on the time series data, a knowledge graph (e.g., knowledge graph 1400 shown in the example of FIG. 14) comprising a plurality of first nodes in the network system referenced in the time series data (2002).

Graph analytics service 226 may receive a graph analysis request (2004), which may include one or more of a request to determine a fault propagation path, a request to determine an impact of an emulated fault, or a request to determine an application-to-network path. Graph analytics service 226 may determine a response to the graph analysis request (2006) and output a response to the graph analysis request (2008).

Returning to FIG. 2, user interface module (UI) 228 can generate data indicative of various user interface screens that graphically depict the results of fault localization (e.g., ranked list 230) and graph analysis. UI module 228 can output, e.g., for display by a separate display device, the data indicative of the various user interface screens. UI module 228 can also output, for display, data indicative of graphical user interface elements that solicit input. Input may be, for example, graph queries to be provided to graph analytics service 226.

As noted above, some or all of root cause analysis framework system 200 may be implemented using containers. For example, root cause analysis framework system 200 may include container platform 219. In some aspects, container platform 219 may be a Kubernetes container platform. Kubernetes is a container management platform that provides portability across public and private clouds, each of which may provide virtualization infrastructure to the risk analysis framework system. In some aspects, each of the components illustrated in FIG. 2 may be a containerized component. In some aspects, each of components illustrated in FIG. 2 may be in-premise components that are not containerized. In some aspects, some of the components of FIG. 2 may be containerized, while other components are in-premise. For instance, some of telemetry services may be in-premise components that may or may not be containerized. For example, network telemetry collector 212 and device/fabric telemetry collector 214 may be located within a customer's network (e.g., in-premise).

FIG. 3 shows a root cause analysis pipeline, in accordance with aspects of the disclosure. In some aspects, root cause analysis pipeline 300 includes knowledge graph generator 220, causal graph generator 222, graph pruner 224 and ranking service 225, each of which is described above with respect to the example of FIG. 2. Cross-layer telemetry is collected across multiple layers of the infrastructure from application to network (e.g., network system 2 of FIG. 1) in the form of timeseries data. This telemetry includes performance metrics for different layers which reflects a health of the different components of the network system. The telemetry can be collected and analyzed in real-time to automatically detect and troubleshoot anomalies and provide root causes of anomalies in a network system.

Processing by root cause analysis pipeline 300 can be initiated when a performance anomaly is detected for a given application. For example, anomaly detector 236 may identify, using ML model 241, anomalies and supply information regarding the anomalies to root cause analysis pipeline 300 using cross-layer telemetry 304. As an example, cross-layer telemetry 304 can include application layer telemetry data, compute/pod layer telemetry data 608, network layer telemetry data, device layer telemetry data, fabric layer telemetry data etc. collected by any of telemetry collector 216, network telemetry data collector 212 and/or device/fabric telemetry collector 214. Additionally, or instead, anomalies may be detected using rule-based anomaly detection and provided to root cause analysis pipeline 300.

After an application performance issue is detected, knowledge graph generator 220 initiates creation of a knowledge graph from the real-time telemetry collected during the time period when the application anomaly is detected. As an example, if an application anomaly is detected at time T, then knowledge graph generator 220 can generate a knowledge graph for the entire infrastructure from application to network using cross-layer telemetry 304 for the past N time periods. Where N can be 5 minutes, 15 minutes, 30 minutes, etc.

Telemetry for each layer is parsed to determine the nodes for each layer and their relationships with the neighboring nodes. Generally speaking, a node can represent any entity in a network system, whether physical, virtual, or software. As an example, a node may represent a device such as a network device, a computing device, a virtual device (e.g., virtual machine, virtual router, VRF etc.), an application, a service, a microservice etc. For example, from the response time telemetry for micro services, caller and callee services can be identified from the labels that are present in the telemetry. Similarly, if an application is hosted on Kubernetes platform, then relationships between a microservice and its multiple instances can be determined from the pod level telemetry.

A knowledge graph generated by knowledge graph generator 220 can include multiple layers such as an Application layer, Pod Instance layer, Compute Node layer, Network Probe layer, and/or Network Fabric Layers. Depending on the environment, other layers in the knowledge graph can be defined and added. For an example, a root cause analysis framework system can be used to model the different components within a router/switch, where dependency of the ingress ports, ingress queues, fabric ports, egress ports, egress queues can be represented as a knowledge graph. Root cause analysis framework system 200 can be extended to such environments.

Figure 6A:
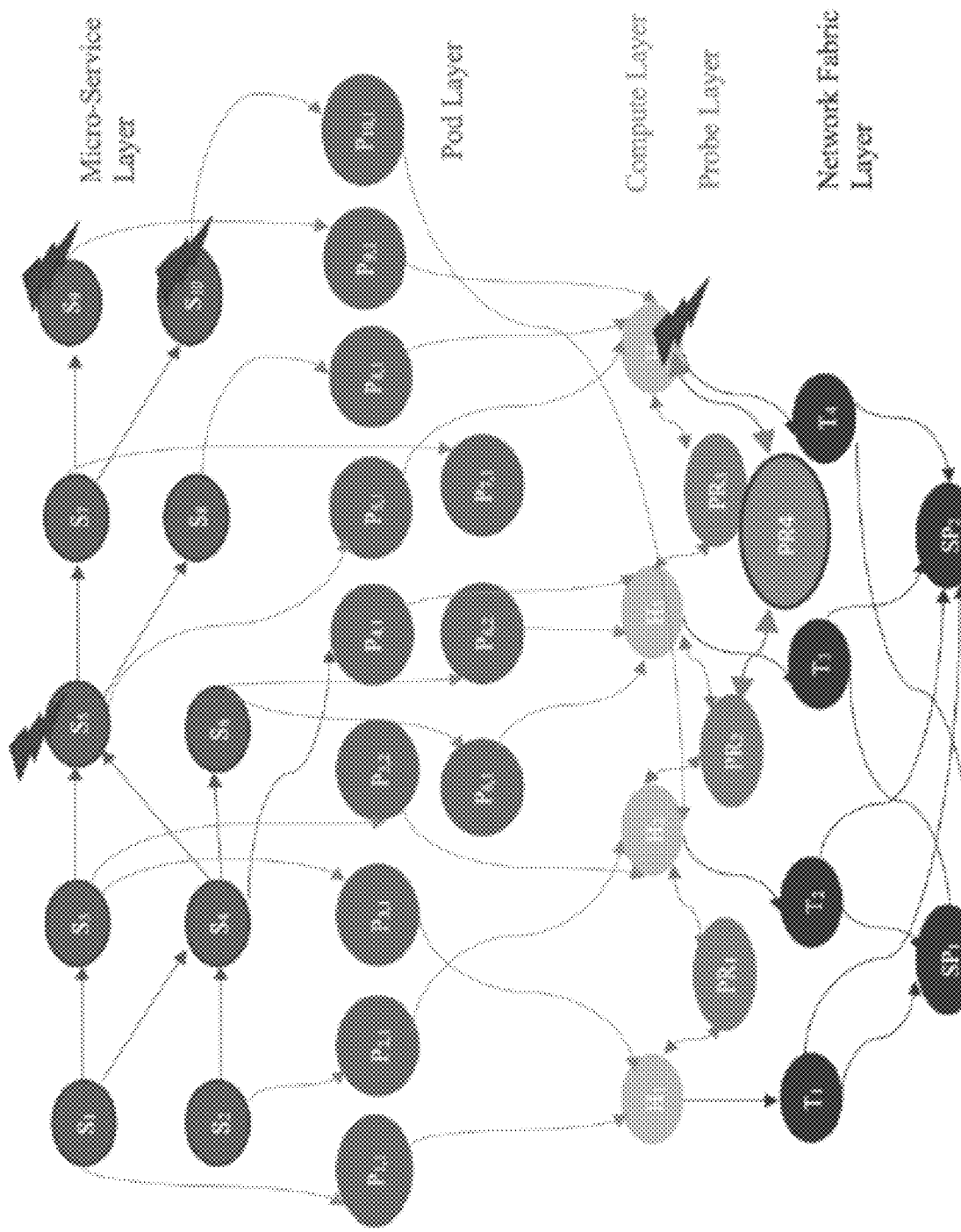
FIG. 6A is a conceptual diagram illustrating an example knowledge graph that may be generated by a knowledge graph generator, in accordance with the techniques described in this disclosure.

FIG. 6A shows an example knowledge graph that may be generated by knowledge graph generator 220. The example shown in FIG. 6A includes nodes at a micro-service layer ("S" nodes), a pod layer ("P" nodes), a computer layer ("H" nodes), a probe layer ("PR" nodes), and a network fabric layer ("T" nodes). FIG. 6A also shows relationships (represented as directional graph edges and depicted as unidirectional arrows in the example of FIG. 6A) that have been discovered, for example, through analysis of TSDB 238. In the example shown in FIG. 6A, anomaly detector 236 has detected anomalies at nodes $S_5$, $S_9$ and $S_{10}$ at the microservice layer (where "S" denotes services), and node $H_4$ at the compute layer (where "H" denotes a host).

Returning to FIG. 3, graph pruner 224 can prune a knowledge graph to a smaller set of nodes based on the anomalies. In some aspects, pruning is done so that only nodes within a threshold distance of a node exhibiting an anomaly are selected. As used herein, a distance between two nodes is the number of edges between the nodes in the graph. In some aspects, the threshold distance is one (1), resulting in selection of the node experiencing the anomaly and its immediate neighbors. Pruning the graph can result in a smaller graph over which further root cause analysis is performed.

Figure 6B:
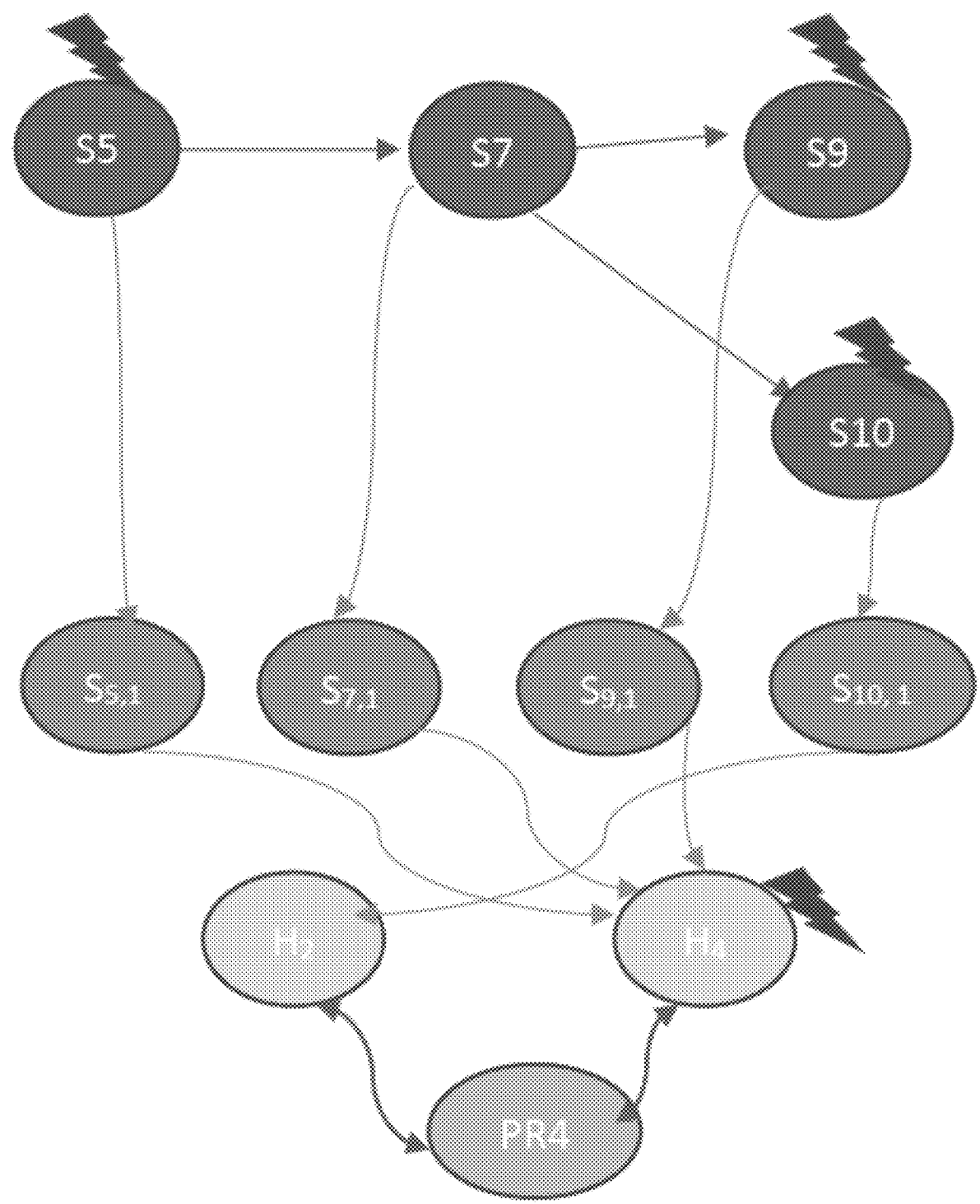
FIG. 6B is a conceptual diagram illustrating an example pruned knowledge graph that may be generated by knowledge graph generator and pruned by graph pruner.

FIG. 6B shows an example pruned knowledge graph that may be generated by knowledge graph generator 220 and pruned by graph pruner 224. In this example, the threshold distance is assumed to be two.

Knowledge graph generator 220 can expose Application Program Interfaces (APIs) for creation and processing of the knowledge graph. An example set of APIs of an example knowledge graph generator is shown in FIG. 11.

Returning to FIG. 3, causality graph generator 222 can create a causality graph based on the pruned knowledge graph. Each node in the pruned knowledge graph has set of distinct KPIs. Causality graph generator 222 can use the KPI to add nodes to the nodes of the pruned knowledge graph. The causality graph can be generated in various ways.

Creating a Causality Graph Based on Time Series Data Analysis Using a Granger Causality Algorithm.

Figure 7A:
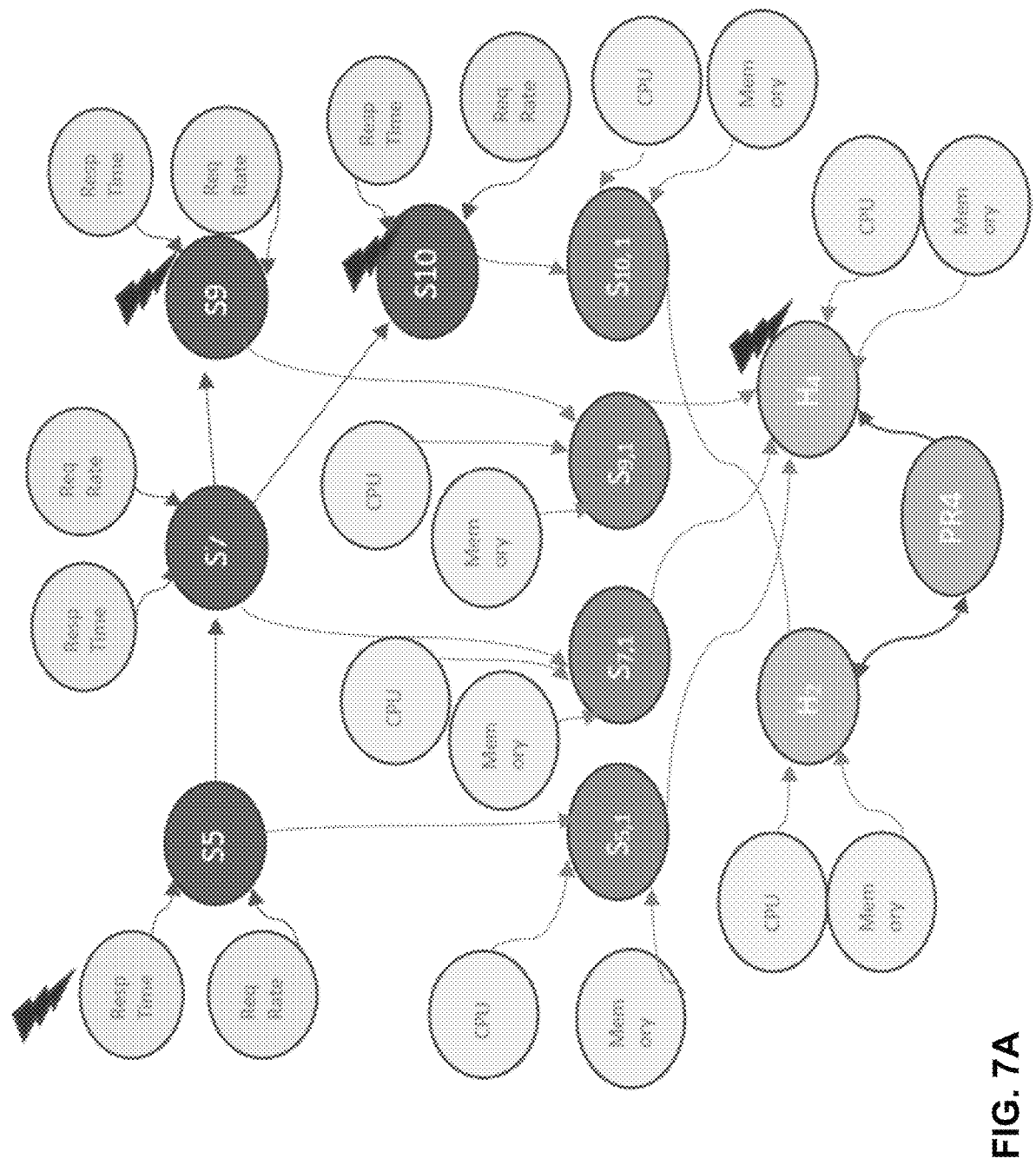
FIG. 7A is a conceptual diagram illustrating an example graph showing the knowledge graph of FIG. 6A with added KPI nodes.
Figure 7B:
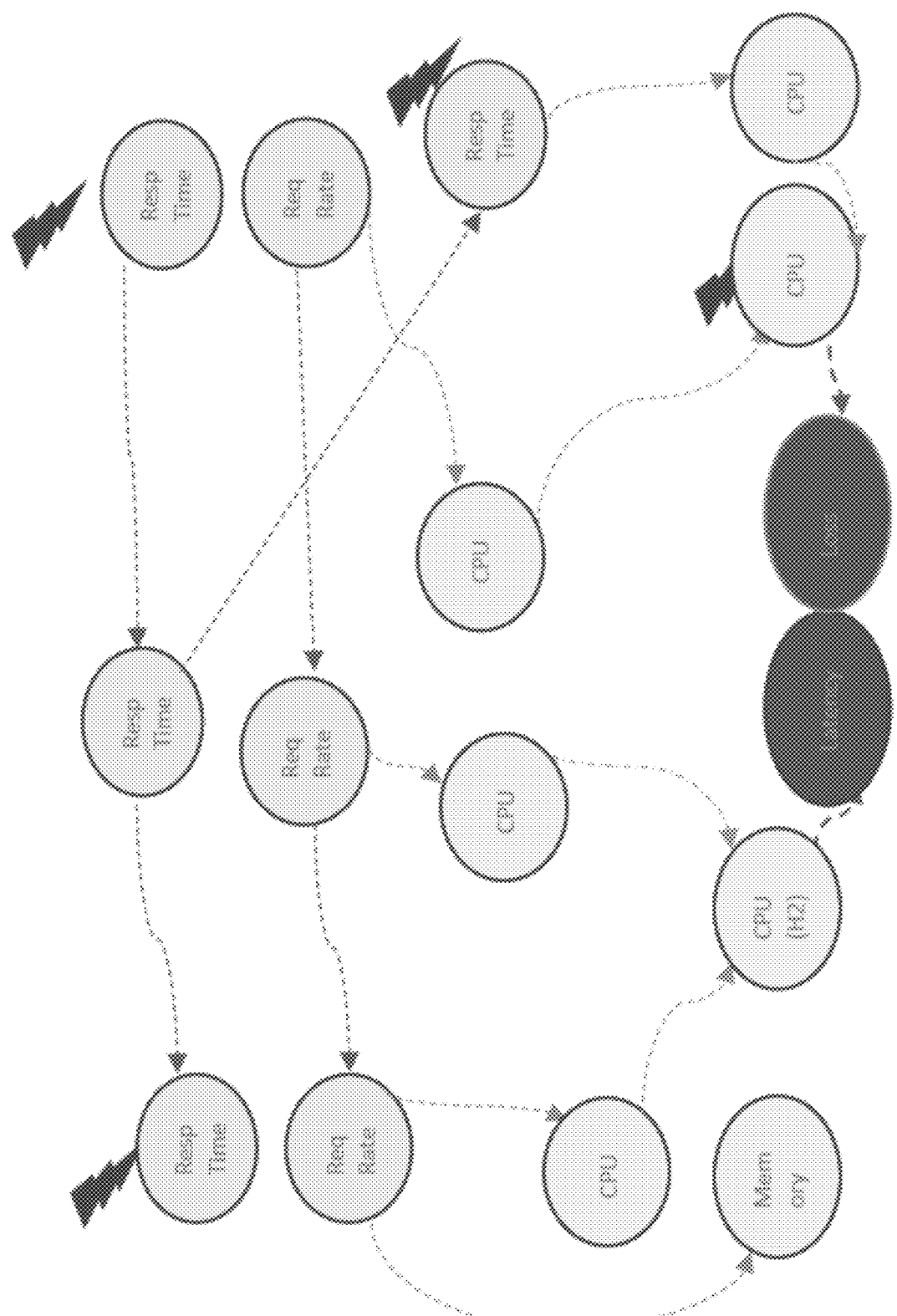
FIG. 7B is a conceptual diagram illustrating an example graph showing causal relationships between the KPI metrics shown in FIG. 7A.
Figure 7C:
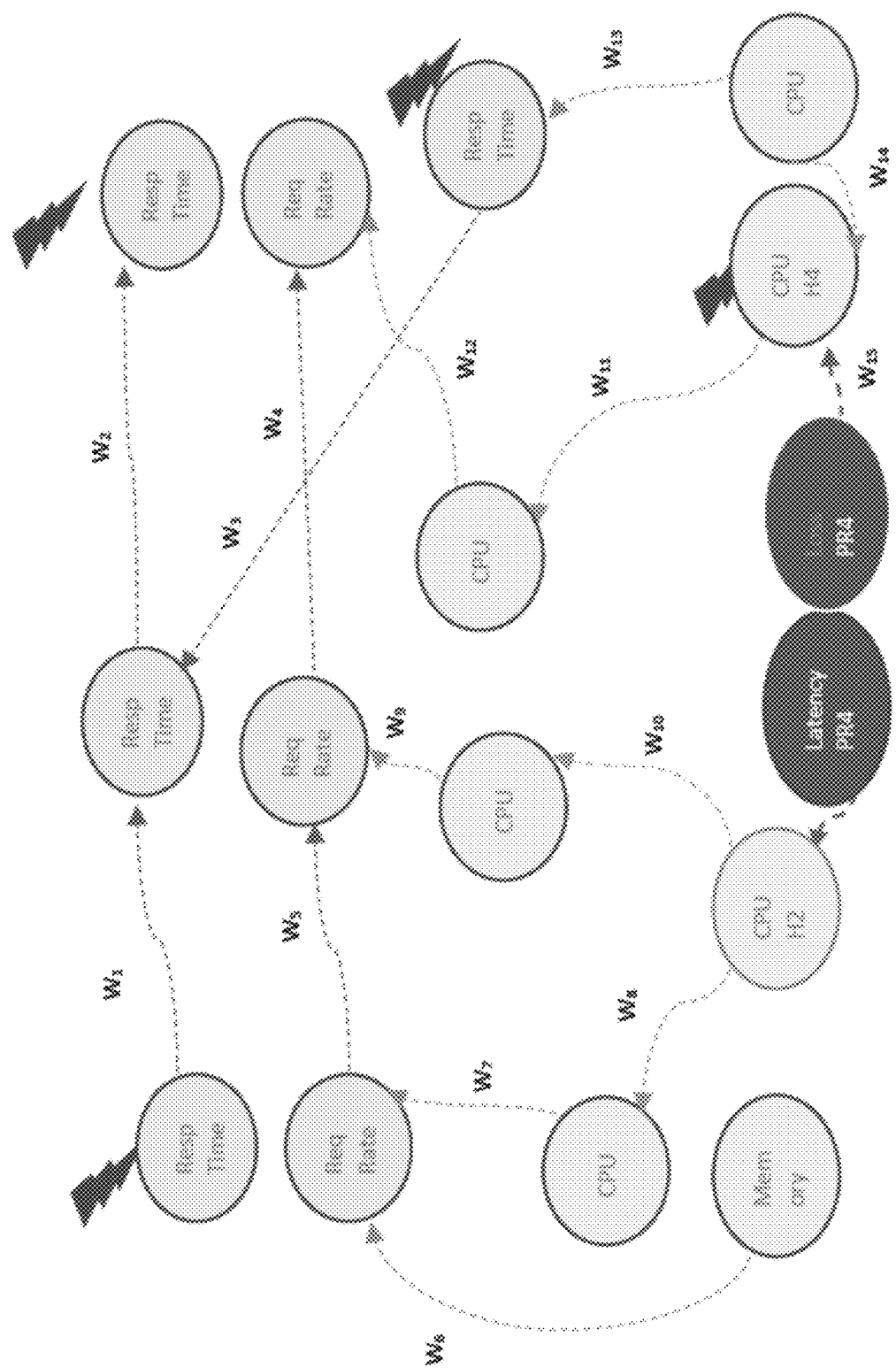
FIG. 7C is a conceptual diagram illustrating an example graph showing the weighted edges created for the graph of FIG. 7B.

Operations of this algorithm are as follows:
1) Determine KPIs for each node in the knowledge graph, create KPIs nodes with edge between KPI and corresponding node in the knowledge graph. FIG. 7A is an example graph showing the knowledge graph of FIG. 6A with added KPI nodes.
2) Discover causal relationship between KPI metrics of the nodes that are adjacent in the knowledge graph. This helps avoiding large number of computations for all possible combinations of KPIs nodes in the pruned knowledge graph. Intuition is that KPIs of nodes that are adjacent in the knowledge graph are more likely to have causal relationship. This avoids running causal analysis across nodes that are multiple levels away from the node. The radius of the analysis is determined by controlling the parameter M, where M=1 by default, i.e., only immediate neighbors are considered for causal analysis. After all possible KPI pairs are determined, then Granger Causality approach is used to determine the causal relationship between two KPIs. FIG. 7B is an example graph showing causal relationships between the KPI metrics shown in FIG. 7A.
3) After Granger Causality is determined, then an edge is created between the KPI nodes. Initial Weight of the edge is determined by measuring correlation between two KPI using Pearson correlation coefficients. Before performing PageRank on the causality graph, directions of edges are reversed, and weights are normalized with number of outgoing degrees of the KPI nodes such that sum of weight of all outgoing edges is 1. This weight represents probability of selecting outgoing edge during random walk in PageRank algorithm. FIG. 7C is an example graph showing the weighted edges created for the graph of FIG. 7B.

Weights for the edges can be determined in various ways, as will now be described.

Normalized Correlation Coefficients Based on Time-Series Data

Figure 8A:
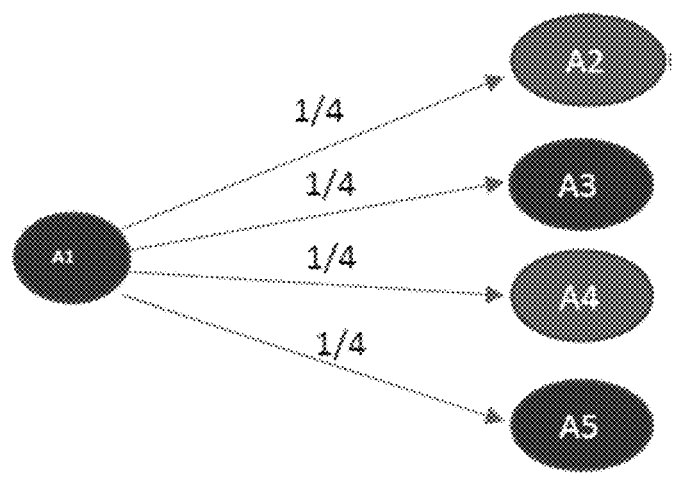
FIGS. 8A-8C are conceptual diagrams illustrating example graphs illustrating weighting of edges in a causality graph, in accordance with techniques of the disclosure.
Figure 8B:
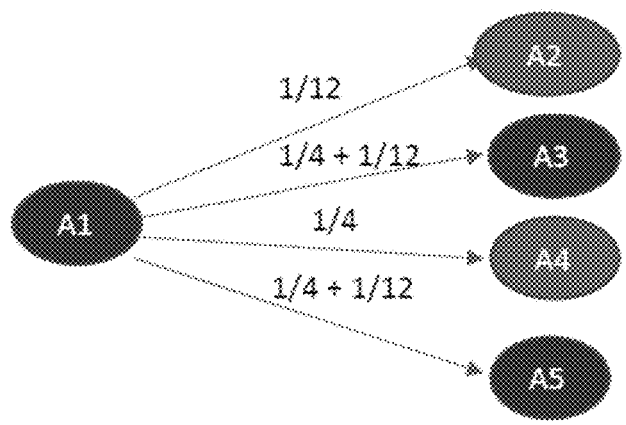
Figure 8C:
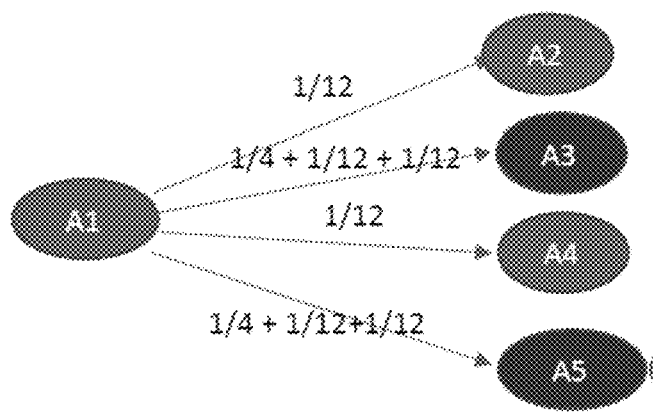

In this case as a first step Pearson correlation coefficient between KPIs of adjacent nodes in causality graph is measured. After that egress edges weights are normalized with respect to their correlation coefficient as below:
  If Node Ni has outgoing edges E1, E2, . . . Ek where Cj is the Pearson correlation coefficient of edge Ej. Then the weight of the Edge $Ej = Cj/\Sigma Ci$ Edge Weight Assignment Based on the Anomaly Status of the Neighbor Nodes The following operations may be performed to determine edge weight based on the anomaly status of neighbor nodes:
1) Initialize weight of each edge as 1/K where K are the outgoing edges.
  For edge e in K
  $W_e = 1/K$
2) If Node Ni has outgoing edges E1, E2, . . . Ek where Aj is the flag indicating if Node j corresponding to edge Ej is anomalous or not. Let L be a set of nodes that have anomalies and M is set of nodes that does not have any anomalies. In that case weight of all the edges are adjusted as follows:
for edge e'm corresponding to non-anomalous nodes in M:
   We'm=We'm/(L+1)//Reduce the weight of non-anomalous node edge
for edge eL corresponding to nodes in L:
   WeL=WeL+w//Proportionally increase the weight of anomalous edges FIGS. 8A-8C are examples illustrating the above. FIG. 8A is an example graph showing an example graph with initial weighing of edges. In this example, node A1 has four neighbor nodes A2-A5, with 4 outgoing edges for which weight needs to be determined. In this example, nodes A3 and A5 are anomalous. In the current example, all anomalies are treated equally. As shown in FIG. 8A, initially, the edges are equally weighted. Each edge from A4 to a neighbor node is initially weighted equally at ¼.

FIGS. 8B and 8C show the progression of weighting based on step 2 above. At the end of this step, higher weight should get assigned to edges towards the anomalous nodes. As a result, both A3 and A5 nodes edges will be assigned equal weight. Subsequently, differentiated weight can be assigned to anomalous edges based on the criticality of the anomalies.

Note that during each iteration of weight of edges that are towards anomalous nodes is increased by reducing the weight of the egress edges that are towards non-anomalous nodes. In some aspects, the sum of the weight of all outgoing edges is always 1.

Creating a Causality Graph Using Temporal Analysis of the Events

Unlike raw time-series analysis, event based analysis can be used to determine the causal relationships between different KPIs and hence generate causal graph. Event is defined as an anomaly that is observed in a KPI metric, where KPI metric can be a continuous time-series performance data or log events generated by different components.

In this approach, relationship between the ordering of Alarm is discovered over multiple iterations over the historical data. Strength of the relationship between two adjacent events based on their timestamp depends on frequency with which they occur within a given period. Note that there can be two types of dependencies between Events:
1. Transient Dependency: In this scenario dependency between events is transient in nature and is only valid for a given time window. A dependency is marked as transient if frequency of occurrence is below a threshold.
2. Persistent Dependency: In this scenario, dependency between events is persistent and is independent of the monitoring time window.

The output of this approach gives a causal graph with the weight determined based on transient or persistent dependency between any two KPI events. Cutoff in the weights can be used to decide what is considered as transient or persistent dependency between alarms. Transient dependencies are based on KPI events that do not occur often or with regularity. Persistent dependencies are based on KPI events that occur repeatedly over a period of time.

There are two stages to create causality graph using temporal analysis of the events. In the first stage ordering of the events based on their occurrence is determined. Then it is determined how frequently two events are adjacent in over multiple observations. If there is tentative causal relationship between two metrics, then the direction of the causal relationship is determined based on the ordering of events in which they occur more frequently.

Figure 9A:
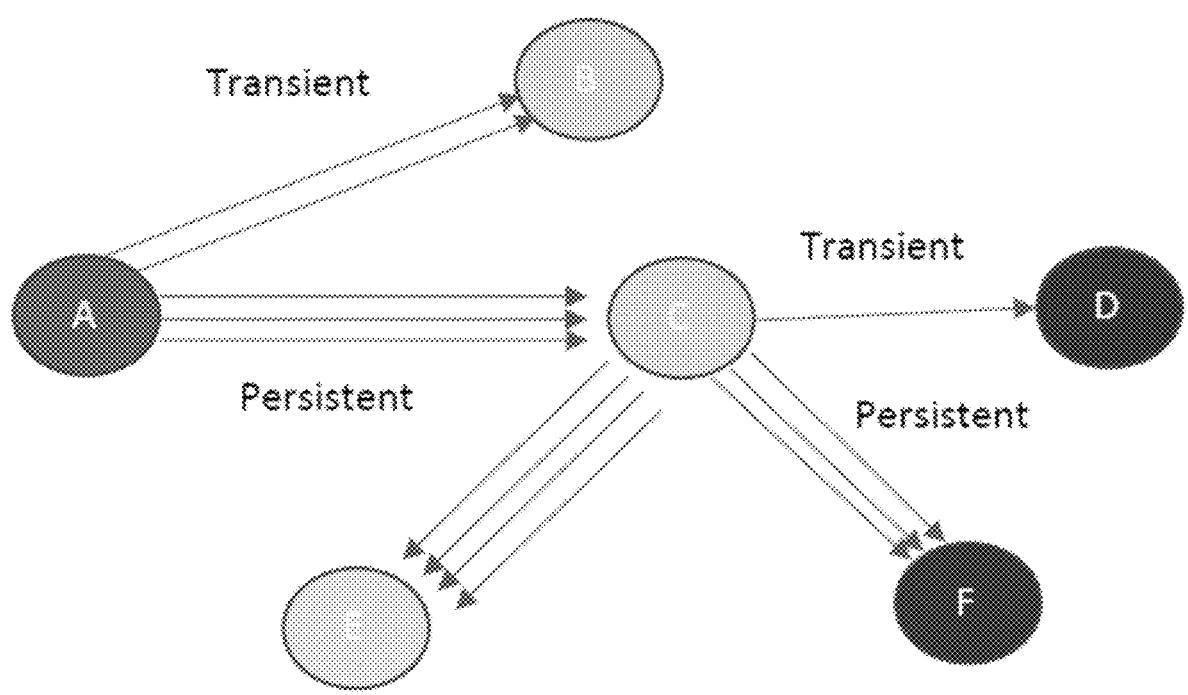
FIGS. 9A-9C are conceptual diagrams illustrating example graphs illustrating weighting of edges in a causality graph, in accordance with techniques of the disclosure.

FIG. 9A shows an example causality graph at a first stage where transient and persistent dependency is discovered over set of events across different KPIs in the knowledge graph.

Figure 9B:
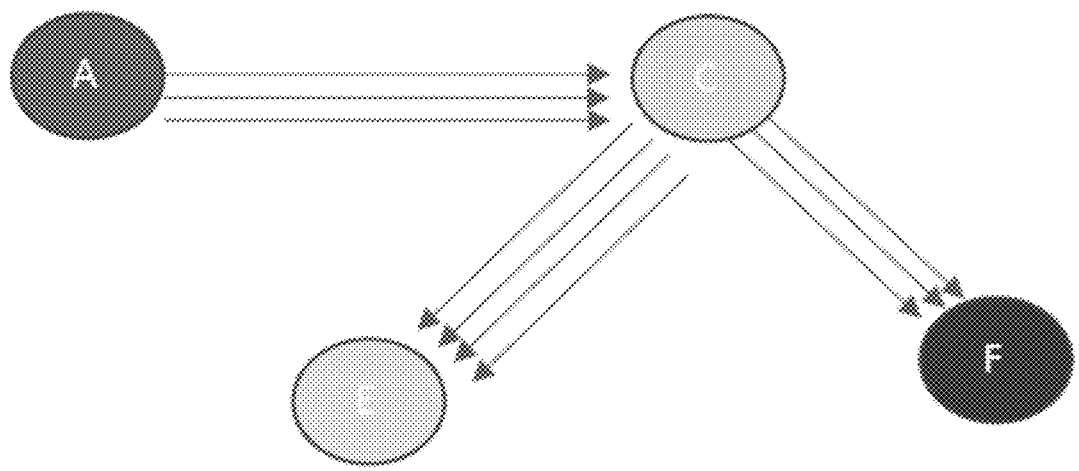

FIG. 9B shows the example causality graph of FIG. 9A after graph pruner 224 has pruned nodes related to transient relationship events, leaving only persistent relationships between events.

Figure 9C:
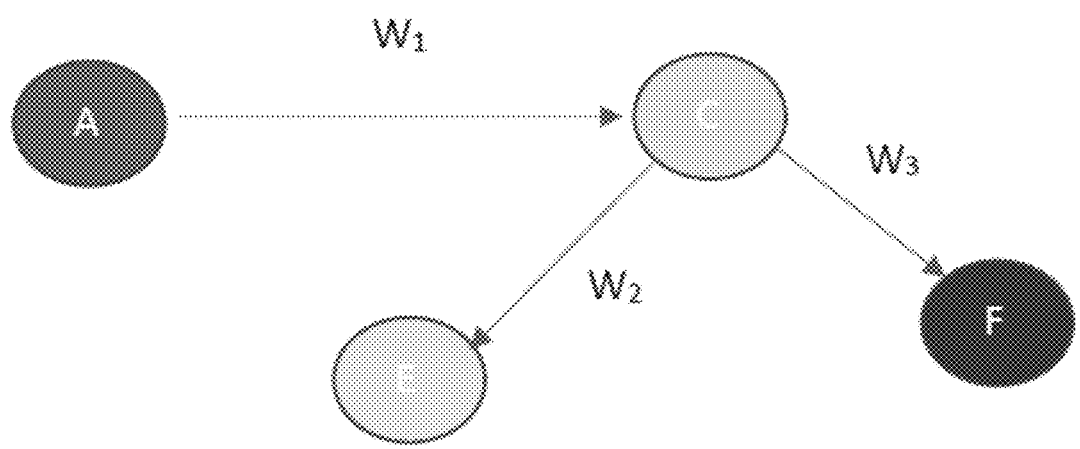

FIG. 9C shows the example causality graph of FIG. 9B with weights based on the strength of the persistent relationships between events.

FIGS. 7A-7C, 8A-8C and 9A-9C show causal graphs created based on different approaches. The root cause analysis framework system disclosed herein is extensible and can incorporate different mechanisms for generating causal graphs. Causality graph generator 222 can expose Application Programming Interfaces (APIs) for creation and processing of the knowledge graph. For example, after a causality graph is generated, the APIs can allow domain experts to optionally audit and modify causal relationship based on the domain knowledge of the system. An example set of APIs for an example causality graph generator is shown in FIG. 12.

Returning to FIG. 3, after causality graph generator 222 has generated a causality graph, ranking service 225 can analyze the graph and rank the most likely root causes of an anomaly. In some aspects, ranking service 225 uses a "PageRank" algorithm to rank the nodes in the causality graph. In the PageRank algorithm, the importance of webpage increases if other important webpages point to the given page. A similar analogy is used to rank the nodes in the causality graph, where node is likely to get higher score if it is being pointed by other nodes to be the root cause.

There are two modes in which a PageRank algorithm is used. In the first mode, a root cause can be determined for all service level anomalies observed in the causality graph. In the second mode, a personalized PageRank algorithm can be used that is focused on performing root cause analysis on a selected set of services or infrastructure components.

In the example presented above with respect to FIGS. 7A-7B, the PageRank algorithm may produce the following ranking of probable root causes:
1. Host H4 CPU—Rank 1
2. Probe module PR4 Latency—Rank 2
3. Probe module PR4 Loss—Rank 3

Figure 10:
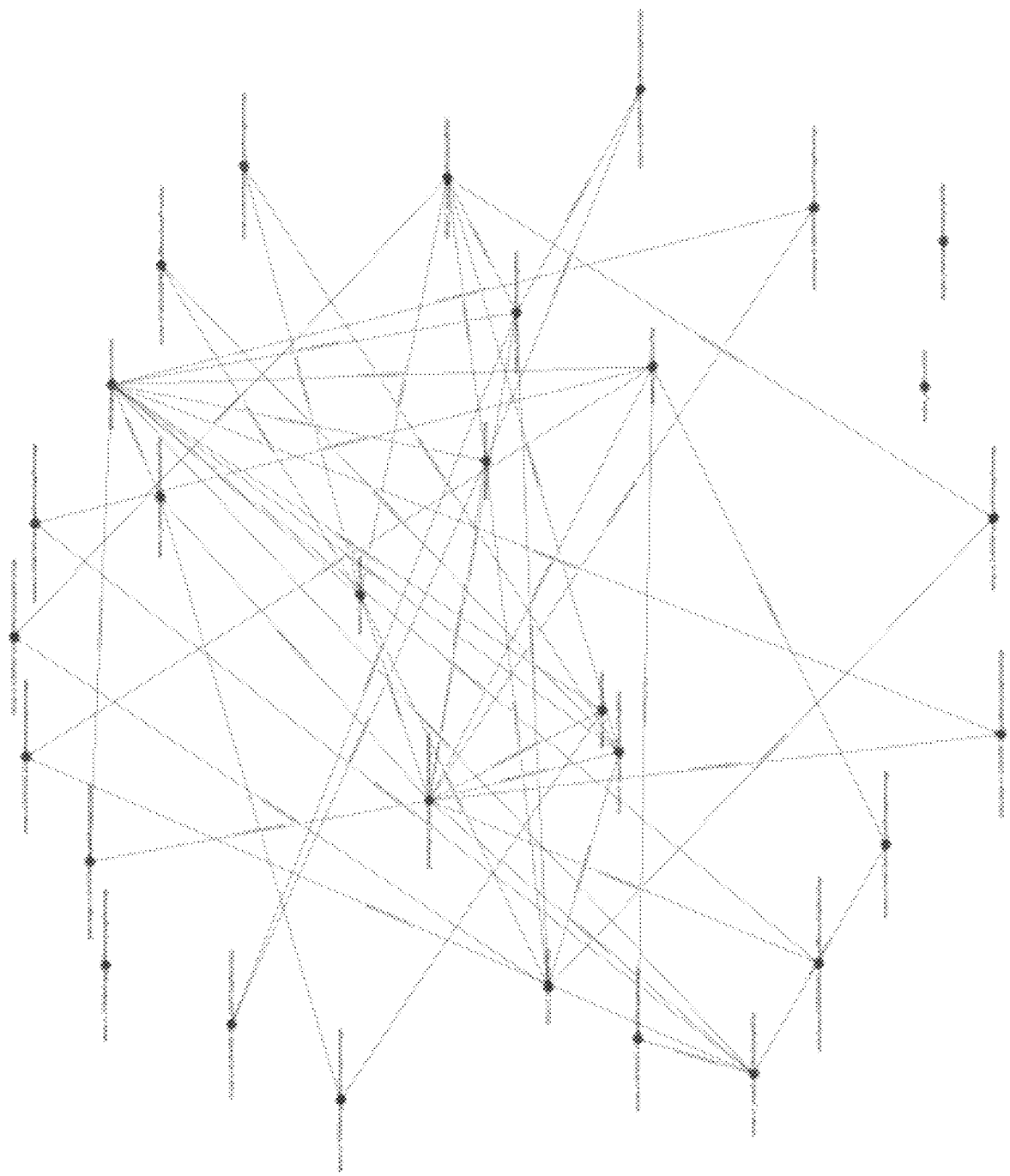
FIG. 10 is a conceptual diagram illustrating a visual representation of an example causality graph associated with the examples described herein.

FIG. 10 shows a visual representation of an example causality graph associated with the examples described above. FIG. 13 shows an example PageRank output from the root cause analysis pipeline described in FIGS. 2 and 3.

Techniques are described for root cause analysis of distributed microservice-based applications deployed in a data center network. The techniques of the disclosure may be adapted to other environments.

Figure 4:
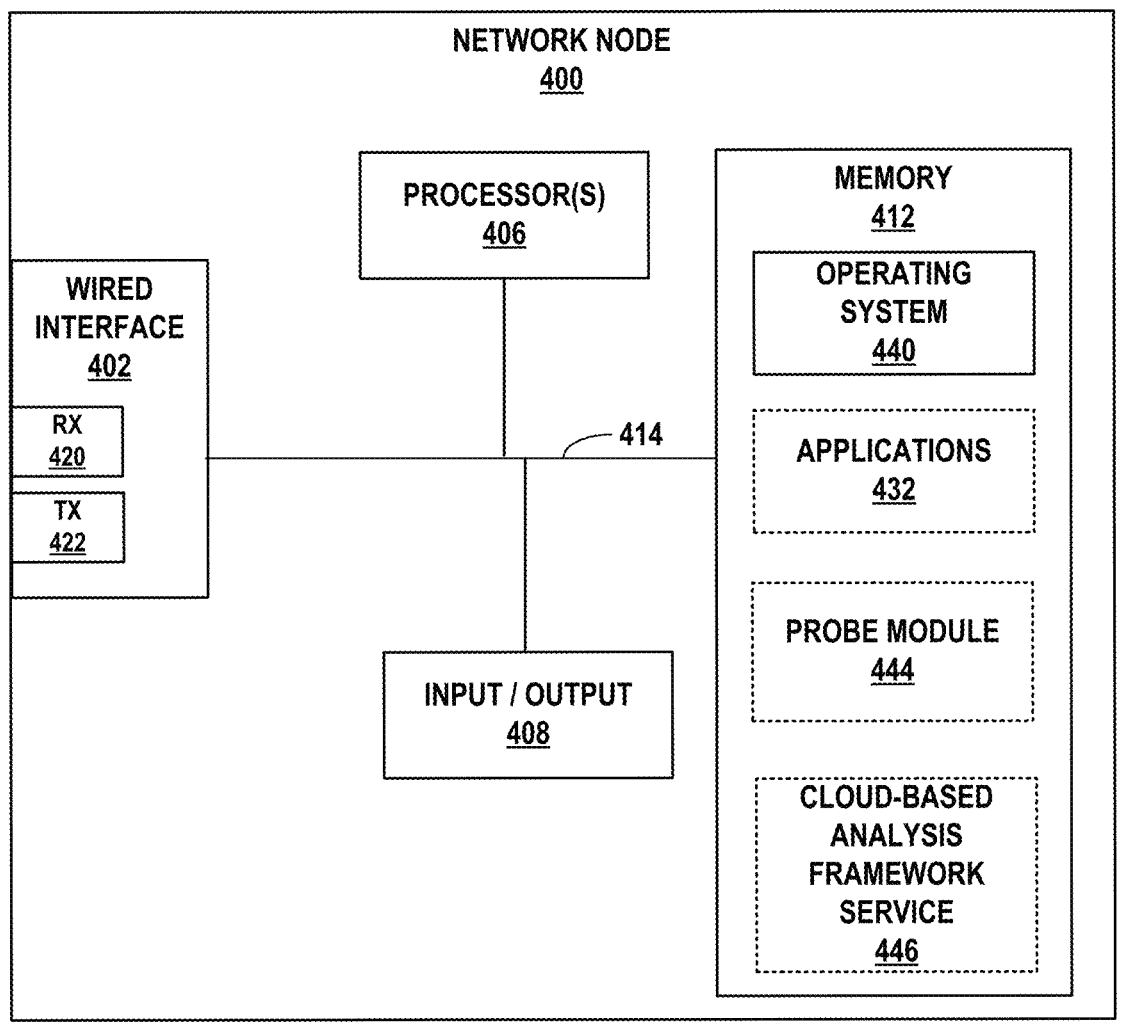
FIG. 4 is a block diagram illustrating an example network node, in accordance with the techniques described in this disclosure.

FIG. 4 is a block diagram illustrating an example network node, in accordance with the techniques described in this disclosure. Network node 400 of FIG. 4 may represent any of network devices 18, server hosting service nodes 10, servers or other computing devices associated with applications 30 of FIG. 1, or servers or computing devices associated with root cause analysis framework systems 28, 200 of FIGS. 1 and 2.

In this example, network node 400 includes a communications interface 402, e.g., an Ethernet interface, a processor 406, input/output 408, e.g., display, buttons, keyboard, keypad, touch screen, mouse, etc., a memory 412 coupled together via a bus 414 over which the various elements may interchange data and information. Communications interface 402 couples the network node 400 to a network, such as an enterprise network. Though only one interface is shown by way of example, those skilled in the art should recognize that network nodes may, and usually do, have multiple communication interfaces. Communications interface 402 includes a receiver (RX) 420 via which the network node 400, e.g., a server, can receive data and information. Communications interface 402 includes a transmitter (TX) 422, via which the network node 400, e.g., a server, can send data and information.

Memory 412 stores executable operating system 440 and may, in various configurations, store software applications 432, probe modules 444 and/or cloud-based framework service 446. For example, network node 400 may be configured as a server that is part of cloud-based services 26 of FIG. 1. In such configurations, application 432 may be an implementation of one or more of applications 30 of FIG. 1. If the performance of software application 432 is being monitored using the techniques described herein, probe module 444 may be an implementation of a probe module 19 of FIG. 1.

Network node 400 may be configured as a server that is part of cloud-based analysis framework 28. In such configurations, memory 412 may store one or more cloud-based analysis framework services 446. Cloud-based analysis framework service 446 may be any of probe services 201, telemetry services 207, event streaming engine 218, fault localizer 240, graph analytics service 226 and/or anomaly detector 236 of FIG. 2.

Figure 5:
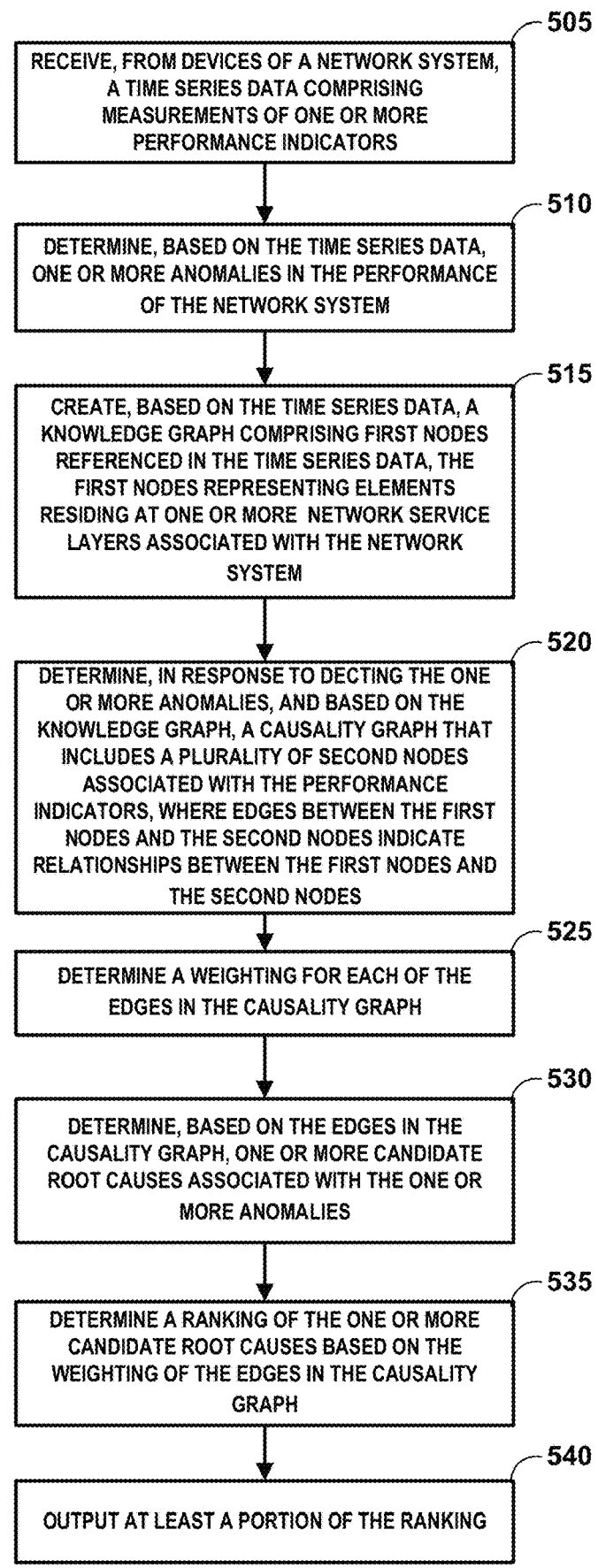
FIG. 5 is a flow diagram illustrating an example operation of a root cause analysis framework system, in accordance with one or more techniques of this disclosure.

FIG. 5 is a flow diagram illustrating an example operation of a root cause analysis framework system, in accordance with one or more techniques of this disclosure. A root cause analysis framework system may receive, from devices of a network system, a time series data comprising measurements of one or more performance indicators (505). Next, the root cause analysis framework system may determine, based on the time series data, one or more anomalies in the performance of the network system (510). Next, the root cause analysis framework system may create, based on the time series data, a knowledge graph comprising a plurality of first nodes in the network system referenced in the time series, the first nodes representing elements residing at one or more of a plurality of network service layers associated with the network system (515). Next, the root cause analysis framework system may determine, in response to detecting the one or more anomalies, and based on the knowledge graph and a machine learning (ML) model trained with previous time series of measurements, a causality graph, wherein the causality graph includes a plurality of second nodes associated with the performance indicators, wherein edges between the first nodes and the second nodes indicate relationships between the first nodes and the second nodes, and wherein the knowledge graph and the causality graph each include edges between one or more of the first nodes and one or more of the second nodes that are associated with elements residing at different layers of the plurality of layers (520). Next, the root cause analysis framework system may determine a weighting for each of the edges in the causality graph (525). Next, the root cause analysis framework system may determine, based on the edges in the causality graph, one or more candidate root causes associated with the one or more anomalies (530). Next, the root cause analysis framework system may determine a ranking of the one or more candidate root causes based on the weighting of the edges in the causality graph (535). Next, the root cause analysis framework system may output at least a portion of the ranking (540).

In this way, one or more aspects of the techniques may enable the following examples.

Example 1A. A method comprising: receiving, by an analysis framework system from devices of a network system, a time series data comprising measurements of one or more performance indicators; determining, by the analysis framework system and based on the time series data, one or more anomalies in the performance of the network system; creating, based on the time series data, a knowledge graph comprising first nodes in the network system referenced in the time series, the first nodes representing elements residing at one or more of a plurality of network service layers associated with the network system; determining, by the analysis framework system in response to detecting the one or more anomalies, and based on the knowledge graph and a machine learning (ML) model trained with previous time series data, a causality graph, wherein the causality graph includes second nodes associated with the performance indicators, wherein edges between the first nodes and the second nodes indicate relationships between the first nodes and the second nodes, and wherein the knowledge graph and the causality graph each includes edges between one or more of the first nodes and one or more of the second nodes that are associated with elements residing at different network service layers of the plurality of network service layers; determining a weighting for each of the edges in the causality graph; determining, based on the edges in the causality graph, one or more candidate root causes associated with the one or more anomalies; determining a ranking of the one or more candidate root causes based on the weighting of the edges in the causality graph; and outputting at least a portion of the ranking.

Example 2A. The method of example 1A, wherein outputting comprises outputting, for display, the at least the portion of the ranking.

Example 3A. The method of any combination of examples 1A and 2A, further comprising: in response to determining the one or more anomalies and prior to determining the causality graph, pruning the knowledge graph to remove first nodes that are more than a threshold distance away from the first nodes of the knowledge graph that are associated with the one or more anomalies, wherein determining the causality graph comprises determining the causality graph based on the pruned knowledge graph.

Example 4A. The method of any combination of examples 1A-3A, wherein the machine learning model comprises a first machine learning model, and wherein determining the one or more anomalies comprises determining the one or more anomalies based on passing the time series data through a second machine learning model trained on the previous time series data.

Example 5A. The method of any combination of examples 1A-4A, wherein determining the one or more anomalies comprises determining the one or more anomalies based on static rules.

Example 6A. The method of any combination of examples 1A-5A, wherein the network service layers include an application layer, a compute layer, a pod layer, a device layer, and a fabric layer.

Example 7A. The method of any combination of examples 1A-6A, wherein determining the causality graph comprises determining the causality graph using a Granger causality algorithm.

Example 8A. The method of any combination of examples 1A-7A, wherein determining the weighting of the edges in the causality graph comprises determining Pearson coefficients of the edges.

Example 9A. The method of any combination of examples 1A-8A, wherein determining the weighting of an edge of the edges in the causality graph comprises determining the weighting based on an anomaly status of neighbor nodes to a first node associated with the edge.

Example 10A. The method of any combination of examples 1A-9A, wherein determining the weighting of an edge of the edges in the causality graph comprises determining the weighting of an edge according to a count of persistent events associated with the edge.

Example 11A. A computing system comprising: a memory configured to store a time series data comprising measurements of one or more performance indicators; and processing circuitry configured to execute an analysis framework system, the analysis framework system configured to: determine, based on the time series data, one or more anomalies in the performance of the network system; create, based on the time series data, a knowledge graph comprising first nodes in the network system referenced in the time series, the first nodes representing elements residing at one or more of a plurality of network service layers associated with the network system; determine, in response to detecting the one or more anomalies, and based on the knowledge graph and a machine learning (ML) model trained with previous time series data, a causality graph, wherein the causality graph includes second nodes associated with the performance indicators, wherein edges between the first nodes and the second nodes indicate relationships between the first nodes and the second nodes, and wherein the knowledge graph and the causality graph each includes edges between one or more of the first nodes and one or more of the second nodes that are associated with elements residing at different network service layers of the plurality of network service layers; determine a weighting for each of the edges in the causality graph; determine, based on the edges in the causality graph, one or more candidate root causes associated with the one or more anomalies; determine a ranking of the one or more candidate root causes based on the weighting of the edges in the causality graph; and output at least a portion of the ranking.

Example 12A. The computing system of example 11A, wherein the processing circuitry is configured to output, for display, the at least the portion of the ranking.

Example 13A. The computing system of any combination of examples 11A-12A, wherein the processing circuitry is further configured to, in response to determining the one or more anomalies and prior to determining the causality graph, prune the knowledge graph to remove first nodes that are more than a threshold distance away from the first nodes of the knowledge graph that are associated with the one or more anomalies, and wherein the processing circuitry is configured to determine the causality graph based on the pruned knowledge graph.

Example 14A. The computing system of any combination of examples 11A-13A, wherein the machine learning model comprises a first machine learning model, and wherein the processing circuitry is configured to determine the one or more anomalies based on passing the time series data through a second machine learning model trained on the previous time series data.

Example 15A. The computing system of any combination of examples 11A-14A, wherein the processing circuitry is configured to determine the one or more anomalies based on static rules.

Example 16A. The computing system of any combination of examples 11A-15A, wherein the network service layers include an application layer, a compute layer, a pod layer, a device layer, and a fabric layer.

Example 17A. The computing system of any combination of examples 11A-16A, wherein the processing circuitry is configured to determine the causality graph using a Granger causality algorithm.

Example 18A. The computing system of any combination of examples 11A-17A, wherein the processing circuitry is configured to determine Pearson coefficients of the edges.

Example 19A. The computing system of any combination of examples 11A-18A, wherein the processing circuitry is configured to determine the weighting based on an anomaly status of neighbor nodes to a first node associated with the edge.

Example 20A. A non-transitory computer-readable storage medium having instructions stored thereon that, when executed, cause one or more processors to execute a framework analysis system, wherein the framework analysis system is configured to: receive a time series data comprising measurements of one or more performance indicators; determine, based on the time series data, one or more anomalies in the performance of the network system; create, based on the time series data, a knowledge graph comprising first nodes in the network system referenced in the time series, the first nodes representing elements residing at one or more of a plurality of network service layers associated with the network system; determine, in response to detecting the one or more anomalies, and based on the knowledge graph and a machine learning (ML) model trained with previous time series data, a causality graph, wherein the causality graph includes second nodes associated with the performance indicators, wherein edges between the first nodes and the second nodes indicate relationships between the first nodes and the second nodes, and wherein the knowledge graph and the causality graph each includes edges between one or more of the first nodes and one or more of the second nodes that are associated with elements residing at different network service layers of the plurality of network service layers; determine a weighting for each of the edges in the causality graph; determine, based on the edges in the causality graph, one or more candidate root causes associated with the one or more anomalies; determine a ranking of the one or more candidate root causes based on the weighting of the edges in the causality graph; and output at least a portion of the ranking.

Example 1B. A method comprising: receiving, by an analysis framework system from devices of a network system, time series data comprising measurements of one or more performance indicators; creating, by the analysis framework system based on the time series data, a knowledge graph comprising a plurality of first nodes in the network system referenced in the time series, the first nodes representing elements residing at one or more of a plurality of layers associated with the network system, wherein edges between two nodes of the plurality of nodes indicate a communication or computing dependency between the two nodes; receiving, by a graph analytics service of the analysis framework system, a graph analysis request, the graph analysis request comprising a request to determine a fault propagation path, a request to determine changes in the graph, a request to determine an impact of an emulated fault, or a request to determine an application-to-network path; determining, by the graph analytics service, a response to the graph analysis request; and outputting, by the analysis frame work system, the response to the graph analysis request.

Example 2B. The method of example 1B, wherein the graph analysis request comprises the request to determine the fault propagation path, the method further comprising: determining, by the analysis framework system and based on the time series data, a first node and a second node that are each experiencing a fault, the first node dependent on the second node; traversing the knowledge graph to determine one or more paths through the knowledge graph from the first node to the second node; and selecting, as a fault propagation path, a path of the one or more paths where an intermediate node in the path between the first node and the second node is experiencing a fault, wherein outputting the response comprises outputting the fault propagation path.

Example 3B. The method of example 2B, wherein the request includes an identification of the first node, and wherein traversing the knowledge graph comprises traversing the knowledge graph from the first node to the second node.

Example 4B. The method of example 2B, wherein the request identifies the second node, and wherein traversing the knowledge graph comprises traversing the knowledge graph from the second node to the first node.

Example 5B. The method of any combination of examples 1B-4B, wherein the graph analysis request comprises the request to determine changes in the graph, wherein the request identifies a first knowledge graph from a first time and a second knowledge graph from a second time later than the first time, wherein the method further comprises: for each layer in the first knowledge graph, comparing the nodes and edges in the layer with the nodes and edges of the corresponding layer in the second knowledge graph and determining one or more differences between the layer of the first knowledge graph and the corresponding layer of the second knowledge graph based on the comparison, wherein outputting the response to the graph analysis request comprises outputting the one or more differences between the layer of the first knowledge graph and the corresponding layer of the second knowledge graph.

Example 6B. The method of example 5B, wherein the one or more differences comprise an added node, a deleted node, an added edge, or a deleted edge.

Example 7B. The method of any combination of examples 1B-6B, wherein the request comprises the request to determine the impact of the emulated fault, the method further comprising: receiving an indication of a first node in the knowledge graph in which to emulate a fault; traversing the knowledge graph to determine one or more paths through the knowledge graph from the first node to one or more second nodes, each second node of the one or more second nodes representing a service of a plurality of services in the network system; and determining a risk score based on a number of the one or more second nodes in the one or more paths and a total number of instances of the plurality of services, wherein outputting the response to the graph analysis request comprises outputting the risk score.

Example 8B. The method of example 7B, wherein the first node represents a compute node in the network system.

Example 9B. The method of example 7B, wherein the first node represents a network device in the network system.

Example 10B. The method of any combination of examples 1B-9B, wherein the graph analysis request comprises the request to determine the application-to-network path and wherein the graph analysis request includes an identification of a first application and a second application, the method further comprising: traversing the knowledge graph from a first node representing the first application to a second mode representing the second application to determine a path from the first node to the second node, the path including one or more compute nodes and one or more network nodes, wherein outputting the result of the graph analytics request comprises outputting identifiers corresponding to the one or more computing nodes and the one or more network nodes.

Example 11B. The method of any combination of examples 1B-10B, wherein outputting comprises outputting, for display, the at least a portion of the ranking.

Example 12B. A computing device comprising: processing circuitry configured to execute an analysis framework system; and a memory configured to store time series data comprising measurements of one or more performance indicators, wherein the analysis framework system is configured to: create, based on the time series data, a knowledge graph comprising a plurality of first nodes in the network system referenced in the time series, the first nodes representing elements residing at one or more of a plurality of layers associated with the network system, wherein edges between two nodes of the plurality of nodes indicate a communication or computing dependency between the two nodes; cause a graph analytics service of the analysis framework system to receive a graph analysis request, the graph analysis request comprising a request to determine a fault propagation path, a request to determine changes in the graph, a request to determine an impact of an emulated fault, or a request to determine an application-to-network path; cause the graph analytics service to determine a response to the graph analysis request; and output the response to the graph analysis request.

Example 12B. The computing device of example 12B, wherein the graph analysis request comprises the request to determine the fault propagation path, the analysis framework system is further configured to determine, based on the time series data, a first node and a second node that are each experiencing a fault, the first node dependent on the second node; traversing the knowledge graph to determine one or more paths through the knowledge graph from the first node to the second node; and select, as a fault propagation path, a path of the one or more paths where an intermediate node in the path between the first node and the second node is experiencing a fault; and output the fault propagation path as the response.

Example 14B. The computing device of example 13B, wherein the request includes an identification of the first node, and wherein the analytics framework system is configured to traverse the knowledge graph from the first node to the second node.

Example 15B. The computing device of example 13B, wherein the request identifies the second node, and wherein the analytics framework system is configured to traverse the knowledge graph from the second node to the first node.

Example 16B. The computing device of any combination of examples 12B-15B, wherein the graph analysis request comprises the request to determine changes in the graph, wherein the request identifies a first knowledge graph from a first time and a second knowledge graph from a second time later than the first time, wherein the analytics framework system is further configured to: for each layer in the first knowledge graph, compare the nodes and edges in the layer with the nodes and edges of the corresponding layer in the second knowledge graph; determine one or more differences between the layer of the first knowledge graph and the corresponding layer of the second knowledge graph based on the comparison; and output the one or more differences between the layer of the first knowledge graph and the corresponding layer of the second knowledge graph as the response.

Example 17B. The computing device of example 16B, wherein the one or more differences comprise an added node, a deleted node, an added edge, or a deleted edge.

Example 18B. The computing device of any combination of examples 12B-17B, wherein the request comprises the request to determine the impact of the emulated fault, the analytics framework system further configured to: receive an indication of a first node in the knowledge graph in which to emulate a fault; traverse the knowledge graph to determine one or more paths through the knowledge graph from the first node to one or more second nodes, each second node of the one or more second nodes representing a service of a plurality of services in the network system; determine a risk score based on a number of the one or more second nodes in the one or more paths and a total number of instances of the plurality of services; and output the risk score as the response.

Example 19B. The computing device of example 18B, wherein the first node represents a compute node in the network system.

Example 20B. The computing device of example 18B, wherein the first node represents a network device in the network system.

Example 21B. The computing device of any combination of examples 12B-20B, wherein the graph analysis request comprises the request to determine the application-to-network path and wherein the graph analysis request includes an identification of a first application and a second application, the analytics framework system further configured to: traverse the knowledge graph from a first node representing the first application to a second mode representing the second application to determine a path from the first node to the second node, the path including one or more compute nodes and one or more network nodes; and output identifiers corresponding to the one or more computing nodes and the one or more network nodes as the response.

Example 22B. The computing device of any combination of examples 12B-21B, wherein the analytics framework system is configured to output, for display, the at least a portion of the ranking as the response.

Example 23B. A non-transitory computer-readable storage medium having instructions stored thereon that, when executed, cause one or more processors to execute an analysis framework system configured to: receive time series data comprising measurements of one or more performance indicators; create, based on the time series data, a knowledge graph comprising a plurality of first nodes in the network system referenced in the time series, the first nodes representing elements residing at one or more of a plurality of layers associated with the network system, wherein edges between two nodes of the plurality of nodes indicate a communication or computing dependency between the two nodes; cause a graph analytics service of the analysis framework system to receive a graph analysis request, the graph analysis request comprising a request to determine a fault propagation path, a request to determine changes in the graph, a request to determine an impact of an emulated fault, or a request to determine an application-to-network path; cause the graph analytics service to determine a response to the graph analysis request; and output the response to the graph analysis request.

Example 1C. A method comprising: determining, by a network system, a topology graph for a network, the topology graph representing a plurality of logical layers of the network; receiving, by the network system, an identifier associated with an application utilizing the network for communications; determining, by the network system and based on the topology graph, a subgraph of the topology graph based on a location, in the topology graph, of a node representing a compute node that is a host of the application; determining, by the network system and based on the subgraph, a set of one or more probe modules to measure performance metrics associated with network communication associated with the application; for each of the one or more probe modules, generating, by the network system, configuration data corresponding to a type of the probe module; and outputting, by the network system and to the probe module, the configuration data corresponding to the probe module.

Example 2C. The method of example 1C, wherein determining the subgraph comprises determining the subgraph based on the node representing the compute node hosting the application and one or more second nodes of the topology graph associated with network infrastructure used by the application to communicate over the network represented by the network topology.

Example 3C. The method of any combination of examples 1C and 2C, wherein determining the set of one or more probe modules comprises determining a set of probe modules for nodes represented at multiple layers of the plurality of layers of the network system.

Example 4C. The method of any combination of examples 1C-3C, wherein the plurality of layers comprise one or more of an underlay network layer, an overlay network layer, and a containerization platform cluster layer.

Example 5C. The method of any combination of examples 1C-4C, further comprising receiving telemetry data from the probe module in accordance with the configuration.

Example 6C. The method of example 5C, further comprising transforming the telemetry data received from the probe module from a format associated with the type of probe module to a standard format.

Example 7C. The method of any combination of examples 5C and 6C, further comprising: aggregating the telemetry data at a first granularity corresponding to a single node of the topology graph; aggregating the telemetry data at a second granularity corresponding to a group of nodes of the topology graph; generating first baseline data based on the telemetry data at the first granularity; and generating second baseline data based on the telemetry data at the second granularity.

Example 8C. The method of any combination of examples 1C-7C, further comprising: storing, by the network system, data associating the probe module to the application; and in response to detecting an anomaly based on telemetry data provided by the probe module, identifying the application as affected by the anomaly based on the data associating the probe module to the application.

Example 9C. The method of any combination of examples 1C-8C, wherein the probe module is configured to measure network performance between two hosts used by the application.

Example 10C. A network system comprising: processing circuitry configured to determine a topology graph for a network, the topology graph representing a plurality of logical layers of the network; and a memory configured to store the topology graph, wherein the processing circuitry is further configured to: receive an identifier associated with an application utilizing the network for communications; determine, based on the topology graph, a subgraph of the topology graph based on a location, in the topology graph, of a node representing a compute node that is a host of the application; determine, based on the subgraph, a set of one or more probe modules to measure performance metrics associated with network communication associated with the application; for each of the one or more probe modules, generate configuration data corresponding to a type of the probe module; and output, to the probe module, the configuration data corresponding to the probe module.

Example 11C. The network system of example 10C, wherein the processing circuitry is configured to determine the subgraph based on the node representing the compute node hosting the application and one or more second nodes of the topology graph associated with network infrastructure used by the application to communicate over the network represented by the network topology.

Example 12C. The network system of any combination of examples 10C and 11C, wherein the processing circuitry is configured to determine a set of probe modules for nodes represented at multiple layers of the plurality of layers of the network system.

Example 13C. The network system of any combination of examples 10C-12C, wherein the plurality of layers comprise one or more of an underlay network layer, an overlay network layer, and a containerization platform cluster layer.

Example 14C. The network system of any combination of examples 10C-13C, wherein the processing circuitry is further configured to receive telemetry data from the probe module in accordance with the configuration.

Example 15C. The network system of example 14C, wherein the processing circuitry is further configured to transform the telemetry data received from the probe module from a format associated with the type of probe module to a standard format.

Example 16C. The network system of any combination of examples 14C and 15C, wherein the processing circuitry is further configured to: aggregate the telemetry data at a first granularity corresponding to a single node of the topology graph; aggregate the telemetry data at a second granularity corresponding to a group of nodes of the topology graph; generate first baseline data based on the telemetry data at the first granularity; and generate second baseline data based on the telemetry data at the second granularity.

Example 17C. The network system of any combination of examples 10C-16C, wherein the processing circuitry is further configured to: store data associating the probe module to the application; and in response to detecting an anomaly based on telemetry data provided by the probe module, identify the application as affected by the anomaly based on the data associating the probe module to the application.

Example 18C. The network system of any combination of examples 10C-17C, wherein the probe module is configured to measure network performance between two hosts used by the application.

Example 19C. A non-transitory computer-readable storage medium having instructions stored thereon that, when executed, cause one or more processors to: determine a topology graph for a network, the topology graph representing a plurality of logical layers of the network; receive an identifier associated with an application utilizing the network for communications; determine, based on the topology graph, a subgraph of the topology graph based on a location, in the topology graph, of a node representing a compute node that is a host of the application; determine, based on the subgraph, a set of one or more probe modules to measure performance metrics associated with network communication associated with the application; for each of the one or more probe modules, generate configuration data corresponding to a type of the probe module; and output, to the probe module, the configuration data corresponding to the probe module.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
receiving, by an analysis framework system from devices of a network system, time series data comprising measurements of one or more performance indicators;
determining, by the analysis framework system and based on the time series data, one or more anomalies in a performance of the network system;
creating, based on the time series data, a knowledge graph comprising first nodes in the network system referenced in the time series, the first nodes representing elements residing at one or more of a plurality of network service layers associated with the network system;
determining, by the analysis framework system in response to detecting the one or more anomalies, and based on the knowledge graph and a machine learning (ML) model trained with previous time series data, a causality graph, wherein the causality graph includes second nodes associated with the performance indicators, wherein edges between the first nodes and the second nodes indicate relationships between the first nodes and the second nodes, and wherein the knowledge graph and the causality graph each includes edges between one or more of the first nodes and one or more of the second nodes that are associated with elements residing at different network service layers of the plurality of network service layers;
determining a weighting for each of the edges in the causality graph;
determining, based on the edges in the causality graph, one or more candidate root causes associated with the one or more anomalies;
determining a ranking of the one or more candidate root causes based on the weighting of the edges in the causality graph; and
outputting at least a portion of the ranking.

2. The method of claim 1, wherein outputting comprises outputting, for display, the at least the portion of the ranking.

3. The method of claim 1, further comprising:
in response to determining the one or more anomalies and prior to determining the causality graph, pruning the knowledge graph to remove first nodes that are more than a threshold distance away from the first nodes of the knowledge graph that are associated with the one or more anomalies,
wherein determining the causality graph comprises determining the causality graph based on the pruned knowledge graph.

4. The method of claim 1,
wherein the machine learning model comprises a first machine learning model, and
wherein determining the one or more anomalies comprises determining the one or more anomalies based on passing the time series data through a second machine learning model trained on the previous time series data.

5. The method of claim 1, wherein determining the one or more anomalies comprises determining the one or more anomalies based on static rules.

6. The method of claim 1, wherein the network service layers include an application layer, a compute layer, a pod layer, a device layer, and a fabric layer.

7. The method of claim 1, wherein determining the causality graph comprises determining the causality graph using a Granger causality algorithm.

8. The method of claim 1, wherein determining the weighting of the edges in the causality graph comprises determining Pearson coefficients of the edges.

9. The method of claim 1, wherein determining the weighting of an edge of the edges in the causality graph comprises determining the weighting based on an anomaly status of neighbor nodes to a first node associated with the edge.

10. The method of claim 1, wherein determining the weighting of an edge of the edges in the causality graph comprises determining the weighting of the edge according to a count of persistent events associated with the edge.

11. A computing system comprising:
a memory configured to store time series data comprising measurements of one or more performance indicators received from devices of a network system; and
processing circuitry configured to execute an analysis framework system, the analysis framework system configured to:
determine, based on the time series data, one or more anomalies in a performance of the network system;
create, based on the time series data, a knowledge graph comprising first nodes in the network system referenced in the time series, the first nodes representing elements residing at one or more of a plurality of network service layers associated with the network system;
determine, in response to detecting the one or more anomalies, and based on the knowledge graph and a machine learning (ML) model trained with previous time series data, a causality graph, wherein the causality graph includes second nodes associated with the performance indicators, wherein edges between the first nodes and the second nodes indicate relationships between the first nodes and the second nodes, and wherein the knowledge graph and the causality graph each includes edges between one or more of the first nodes and one or more of the second nodes that are associated with elements residing at different network service layers of the plurality of network service layers;
determine a weighting for each of the edges in the causality graph;
determine, based on the edges in the causality graph, one or more candidate root causes associated with the one or more anomalies;

determine a ranking of the one or more candidate root causes based on the weighting of the edges in the causality graph; and output at least a portion of the ranking.

12. The computing system of claim 11, wherein the processing circuitry is configured to output, for display, the at least the portion of the ranking.

13. The computing system of claim 11,
wherein the processing circuitry is further configured to, in response to determining the one or more anomalies and prior to determining the causality graph, prune the knowledge graph to remove first nodes that are more than a threshold distance away from the first nodes of the knowledge graph that are associated with the one or more anomalies, and
wherein the processing circuitry is configured to determine the causality graph based on the pruned knowledge graph.

14. The computing system of claim 11,
wherein the machine learning model comprises a first machine learning model, and
wherein the processing circuitry is configured to determine the one or more anomalies based on passing the time series data through a second machine learning model trained on the previous time series data.

15. The computing system of claim 11, wherein the processing circuitry is configured to determine the one or more anomalies based on static rules.

16. The computing system of claim 11, wherein the network service layers include an application layer, a compute layer, a pod layer, a device layer, and a fabric layer.

17. The computing system of claim 11, wherein the processing circuitry is configured to determine the causality graph using a Granger causality algorithm.

18. The computing system of claim 11, wherein the processing circuitry is configured to determine Pearson coefficients of the edges.

19. The computing system of claim 11, wherein the processing circuitry is configured to determine the weighting based on an anomaly status of neighbor nodes to a first node associated with the edge.

20. Non-transitory computer-readable storage media having instructions stored thereon that, when executed, cause one or more processors to execute a framework analysis system, wherein the framework analysis system is configured to:

receive, from one or more devices of a network system, time series data comprising measurements of one or more performance indicators;

determine, based on the time series data, one or more anomalies in a performance of the network system;

create, based on the time series data, a knowledge graph comprising first nodes in the network system referenced in the time series, the first nodes representing elements residing at one or more of a plurality of network service layers associated with the network system;

determine, in response to detecting the one or more anomalies, and based on the knowledge graph and a machine learning (ML) model trained with previous time series data, a causality graph, wherein the causality graph includes second nodes associated with the performance indicators, wherein edges between the first nodes and the second nodes indicate relationships between the first nodes and the second nodes, and wherein the knowledge graph and the causality graph each includes edges between one or more of the first nodes and one or more of the second nodes that are associated with elements residing at different network service layers of the plurality of network service layers;

determine a weighting for each of the edges in the causality graph;

determine, based on the edges in the causality graph, one or more candidate root causes associated with the one or more anomalies;

determine a ranking of the one or more candidate root causes based on the weighting of the edges in the causality graph; and output at least a portion of the ranking.

* * * * *